United States Patent
Oda et al.

(10) Patent No.: US 10,527,781 B2
(45) Date of Patent: Jan. 7, 2020

(54) COMMUNICATION SYSTEM AND CONNECTOR

(71) Applicant: NIPPON TELEGRAPH AND TELEPHONE CORPORATION, Tokyo (JP)

(72) Inventors: Takuya Oda, Yokosuka (JP); Tetsuro Inui, Yokosuka (JP); Akira Hirano, Yokosuka (JP); Wataru Imajuku, Yokosuka (JP); Shoukei Kobayashi, Yokosuka (JP); Takafumi Tanaka, Yokosuka (JP); Yutaka Miyamoto, Yokosuka (JP); Hidehiko Takara, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/776,566

(22) PCT Filed: Nov. 22, 2016

(86) PCT No.: PCT/JP2016/084630
§ 371 (c)(1),
(2) Date: May 16, 2018

(87) PCT Pub. No.: WO2017/090622
PCT Pub. Date: Jun. 1, 2017

(65) Prior Publication Data
US 2018/0341060 A1    Nov. 29, 2018

(30) Foreign Application Priority Data
Nov. 26, 2015    (JP) .................................. 2015-230873

(51) Int. Cl.
G02B 6/02        (2006.01)
G02B 6/26        (2006.01)
(Continued)

(52) U.S. Cl.
CPC ........... *G02B 6/02042* (2013.01); *G02B 6/26* (2013.01); *H04B 10/2581* (2013.01);
(Continued)

(58) Field of Classification Search
CPC .. C03B 2203/34; G02B 6/02042; G02B 6/26; H04B 10/2581; H04B 10/27; H04J 14/02; H04J 14/04
(Continued)

(56) References Cited

U.S. PATENT DOCUMENTS 6,785,472 B1 *   8/2004   Adams .................. H04B 10/27
                                                       398/59
7,643,751 B2 *   1/2010   Sone ................... H04J 14/0204
                                                       398/4
(Continued)

FOREIGN PATENT DOCUMENTS

JP      2013-106272 A       5/2013
WO   WO-2009/107414 A1     9/2009
(Continued)

OTHER PUBLICATIONS

International Search Report issued in PCT/JP2016/084630, dated Feb. 7, 2017; ISA/JP, with English translation attached.
(Continued)

*Primary Examiner* — Amritbir K Sandhu
(74) *Attorney, Agent, or Firm* — Harness, Dickey & Pierce, P.L.C.

(57) ABSTRACT

A communication system includes three or more nodes and a multi-core fiber having a plurality of cores, the multi-core fiber being used in at least a partial segment of the connec-
(Continued)

tion between the nodes is provided. One node of the nodes is connected to the multi-core fiber and includes a connector configured to add and drop a signal to and from an allocated core exclusively allocated from among the cores as a communication path between the one node and another node of the nodes and/or configured to relay a signal transmitted through another core of the cores allocated for communication between other nodes in the multi-core fiber connected to the one node, and a relative positional relationship between a connection position of the allocated core in which a signal is added or dropped in the connector and a connection position of another core in which a signal is relayed in the connector is the same for all of the nodes connected to the multi-core fiber.

19 Claims, 20 Drawing Sheets

(51) Int. Cl.
  *H04B 10/27* (2013.01)
  *H04B 10/2581* (2013.01)
  *H04J 14/02* (2006.01)
  *H04J 14/04* (2006.01)
(52) U.S. Cl.
  CPC ............. *H04B 10/27* (2013.01); *H04J 14/02* (2013.01); *H04J 14/04* (2013.01); *C03B 2203/34* (2013.01)
(58) Field of Classification Search
  USPC .................................................. 398/140–143
  See application file for complete search history.

(56) References Cited

U.S. PATENT DOCUMENTS

| | | | | |
|---|---|---|---|---|
| 9,515,450 | B2* | 12/2016 | Matsuo | G02B 6/02042 |
| 10,382,843 | B2* | 8/2019 | Xia | H04Q 11/0005 |
| 2002/0101636 | A1* | 8/2002 | Xiao | G02B 6/29362 |
| | | | | 398/83 |
| 2004/0228631 | A1* | 11/2004 | Mantin | H04J 14/0204 |
| | | | | 398/83 |
| 2005/0031348 | A1* | 2/2005 | Choi | H04J 14/0227 |
| | | | | 398/59 |
| 2006/0210274 | A1* | 9/2006 | Lichtman | H04J 14/0201 |
| | | | | 398/83 |
| 2012/0155806 | A1* | 6/2012 | Doerr | G02B 6/29323 |
| | | | | 385/37 |
| 2012/0177365 | A1* | 7/2012 | Winzer | H04B 10/2581 |
| | | | | 398/26 |
| 2012/0294607 | A1* | 11/2012 | Winzer | H01S 3/094061 |
| | | | | 398/28 |
| 2012/0321309 | A1* | 12/2012 | Barry | H04J 14/00 |
| | | | | 398/51 |
| 2013/0121693 | A1 | 5/2013 | Tanaka et al. | |
| 2013/0136404 | A1* | 5/2013 | Feuer | G02B 6/02042 |
| | | | | 385/124 |
| 2013/0209106 | A1* | 8/2013 | Mukasa | H04B 10/2581 |
| | | | | 398/79 |
| 2013/0236175 | A1* | 9/2013 | Sethumadhavan | H04J 14/04 |
| | | | | 398/55 |
| 2014/0140694 | A1* | 5/2014 | Zhou | H04J 14/02 |
| | | | | 398/44 |
| 2015/0085351 | A1* | 3/2015 | Fontaine | H01S 3/094065 |
| | | | | 359/341.3 |
| 2016/0072587 | A1* | 3/2016 | Pilipetskii | H04J 14/0221 |
| | | | | 398/79 |
| 2017/0299806 | A1* | 10/2017 | Kopp | G02B 6/02042 |
| 2018/0063607 | A1* | 3/2018 | Xia | H04B 10/2581 |
| 2018/0337726 | A1* | 11/2018 | Oda | H04B 10/077 |
| 2018/0341060 | A1* | 11/2018 | Oda | G02B 6/26 |
| 2018/0343067 | A1* | 11/2018 | Oda | H04B 3/44 |
| 2018/0358773 | A1* | 12/2018 | Oda | G02F 1/35 |
| 2018/0359024 | A1* | 12/2018 | Oda | H04B 10/0771 |
| 2018/0375579 | A1* | 12/2018 | Oda | G02B 6/26 |

FOREIGN PATENT DOCUMENTS

| | | |
|---|---|---|
| WO | WO-2013/128929 A1 | 9/2013 |
| WO | WO-2014/141533 A1 | 9/2014 |

OTHER PUBLICATIONS

Shinji Matsuoka, Ultrahigh-speed Ultrahigh-capacity Transport Network Technology for Cost-effective Core and Metro Networks, NTT Technical Journal, Mar. 2011, pp. 8-12 with English version.
Yutaka Miyamoto and Hirokazu Takenouchi, Dense Space-division-multiplexing Optical Communications Technology for Petabit-per-second Class Transmission, NTT Technical Journal, Aug. 2014, pp. 52-56 with English version.
Kazuyuki Shiraki, R&D Trends in Optical Fiber and Cable Technology, NTT Technical Journal, Jan. 2015, pp. 59-63 with English version.
R. R. Thomson, et al, "Ultrafast-laser inscription of a three dimensional fan-out device for multicore fiber coupling applications", Optics Express, OSA Publishing, Sep., 2007, vol. 15, No. 18, pp. 11691-11697.
W. Klaus, et al, "Free-Space Coupling Optics for Multicore Fibers", Photonics Technology Letters, IEEE, Nov. 2012, vol. 24, No. 21, pp. 1902-1905.
Japanese Office Action "Notice of Allowance" for parallel application JP 2017-552669, dated Jul. 3, 2018, with English translation attached.
Kotaro Saito et al., "Multi-core fiber based pluggable add/drop link using rotational connector", 2015 Optical Fiber Communications Conference and Exhibition (OFC), Mar. 22, 2015, pp. 1-3, XP032784765, DOI: 10.1364/OFC.2015.M2B.2 [retrieved on Jun. 10, 2015].
Extended European Search report regarding EPSN 168685659, dated May 2, 2019.

* cited by examiner

CROSS-SECTIONAL VIEW OF MCF

COMMUNICATION SYSTEM AND CONNECTOR

TECHNICAL FIELD

The present invention relates to a communication system and a connector.

This application is a 371 National Phase of PCT/JP2016/084630, filed on Nov. 22, 2016. Priority is claimed on Japanese Patent Application No. 2015-230873, filed Nov. 26, 2015; the content of both applications is incorporated herein by reference.

BACKGROUND ART

A communication network which uses optical fibers is constructed in a core network that connects together metropolises and a metro network that connects together bases in an area. In such a network, a plurality of optical fibers are used in a bundle. Wavelength division multiplexing (WDM) transmission which involves multiplexing a plurality of optical signals having different wavelengths is performed on respective individual optical fibers to realize high-capacity signal transmission (for example, see Non-Patent Literature 1). In order to further increase the transmission capacity, the use of a multi-core fiber (MCF) which is an optical fiber having a plurality of cores instead of an optical fiber (single core fiber: SCF) having one core has been discussed (for example, see Non-Patent Literatures 2 and 3).

In a node of a ring network for wavelength division multiplexing transmission which uses SCF, it is necessary to divide multiplexed optical signals in respective wavelengths in order to add and drop desired signals from optical signals that are multiplex-transmitted through an optical fiber. When a network is configured using MCF instead of SCF in the future, the number of optical signals will increase as the number of transmission cores and the number of signals divided in respective wavelengths will also increase dramatically. Due to this, when a method similar to ADD/Drop in the network which uses SCF is applied to a network which uses MCF, there is a problem that a device for performing Add/Drop of optical signals in each node becomes complex. Moreover, there is another problem that installation and maintenance of nodes take time and labor.

CITATION LIST

Non-Patent Literature

[Non-Patent Literature 1]
Shinji Matsuoka, "Ultrahigh-speed Ultrahigh-capacity Transport Network Technology for Cost-effective Core and Metro Networks," NTT Technical Journal, March 2011, pages 8-12

[Non-Patent Literature 2]
Yutaka Miyamoto and Hirokazu Takenouchi, "Dense Space-division-multiplexing Optical Communications Technology for Petabit-per-second Class Transmission," NTT Technical Journal, August 2014, pages 52-56

[Non-Patent Literature 3]
Kazuyuki Shiraki, "R&D Trends in Optical Fiber and Cable Technology," NTT Technical Journal, January 2015, pages 59-63

SUMMARY OF INVENTION

Technical Problem

In view of the above-described problems, an object of the present invention is to provide a communication system and a connector which facilitate adding and dropping of optical signals in nodes connected to a multi-core fiber.

Solution to Problem

A communication system of a first aspect of the present invention is a communication system which includes three or more nodes and a multi-core fiber having a plurality of cores, the multi-core fiber being used in at least a partial segment of the connection between the nodes, wherein one node of the nodes is connected to the multi-core fiber and includes a connector configured to add and drop a signal to and from an allocated core exclusively allocated from among the cores as a communication path between the one node and another node of the nodes and/or configured to relay a signal transmitted through another core of the cores allocated for communication between other nodes in the multi-core fiber connected to the one node, and a relative positional relationship between a connection position of the allocated core in which a signal is added or dropped in the connector and a connection position of another core in which a signal is relayed in the connector is the same for all of the nodes connected to the multi-core fiber.

According to a second aspect of the present invention, in the communication system of the first embodiment, each of the nodes is connected to two other nodes.

According to a third aspect of the present invention, in the communication system of the first embodiment, at least one node of the nodes has a communication path directed to each of the other nodes, and each communication path uses a respective allocated core.

According to a fourth aspect of the present invention, in the communication system of the first embodiment, a plurality of the nodes have communication paths directed to other nodes of the nodes, respectively, and each of the communication paths uses a respective allocated core.

According to a fifth aspect of the present invention, in the communication system of the fourth embodiment, all of the nodes have communication paths directed to the other nodes, respectively, and each of the communication paths uses a respective allocated core.

According to a sixth aspect of the present invention, in the communication system of the first embodiment, the one node has one communication path for each communication target node of the nodes.

According to a seventh aspect of the present invention, in the communication system of the first embodiment, the one node has a communication path for each communication target node of the nodes, and the allocated core allocated to the communication path differs for each communication target node.

According to an eighth aspect of the present invention, in the communication system of the first embodiment, the one node uses different communication paths for transmission and reception in communication with a communication target node of the nodes, and each of the communication paths uses a respective allocated core.

According to a ninth aspect of the present invention, in the communication system of the first embodiment, the one node uses a communication path for transmission and reception in communication with a communication target node of the nodes, and the allocated core is used for the communication path.

According to a tenth aspect of the present invention, in the communication system of the first embodiment, the plurality of cores are arranged on a circumference around a central shaft of the multi-core fiber, and the connector is attached to the multi-core fiber at a position rotated by different angle at each of the nodes around the central axis with respect to a reference position.

According to an eleventh aspect of the present invention, in the communication system of the first embodiment, the connector includes: at least one connecting portion configured to add or drop a signal to or from the core through which communication with another node adjacent to the one node in which the connector is provided; and at least one signal relay portion configured to relay a signal transmitted through the core allocated for communication between the other nodes in the multi-core fiber connected to the one node, and the number of the at least one signal relay portion provided in the connector is equal to or larger than the number of other node of the nodes through which a communication path from the one node to a communication target node of the nodes passes.

According to a twelfth aspect of the present invention, in the communication system of the first embodiment, the connector includes: a first connector portion configured to add and drop a signal to and from a communication core used for communication between the one node and another node of the nodes among the plurality of cores and configured to relay signals of communication cores other than the communication core to and from which the signal is added and dropped between multi-core fibers connected to the one node in which the connector is provided; and a second connector portion configured to add, drop or relay a signal to, from or between common cores used for a purpose other than communication between the nodes among the plurality of cores.

According to a thirteenth aspect of the present invention, in the communication system of the twelfth embodiment, the one node connected to the multi-core fiber uses the signals added or dropped by the second connector portion.

According to a fourteenth aspect of the present invention, in the communication system of the twelfth embodiment, the second connector portion provided in the one node connected to the multi-core fiber adds or drops a signal to or from one core of the common cores.

According to a fifteenth aspect of the present invention, in the communication system of the first embodiment, the connector includes small-diameter single-mode fibers provided to correspond to the plurality of cores, and the small-diameter single-mode fibers are configured to add or drop signals to or from the plurality of cores and are configured to relay signals between multi-core fibers connected to the one node in which the connector is provided.

According to a sixteenth aspect of the present invention, in the communication system of the first embodiment, the connector includes an optical waveguide including waveguide cores provided to correspond to the plurality of cores, and the waveguide cores are configured to add or drop signals to or from the plurality of the cores and are configured to relay signals between multi-core fibers connected to the one node in which the connector is provided.

According to a seventeenth aspect of the present invention, in the communication system of the first embodiment, the connector includes: a first optical element configured to spatially split signals output from the plurality of cores of the multi-core fiber connected to the one node in which the connector is provided; a second optical element configured to drop a signal by changing a propagating direction of the signal spatially split by the first optical element to the outside of the connector; a third optical element configured to add an input signal by changing a propagating direction of the input signal input from the outside of the connector to the propagating direction of spatially split signals; and a fourth optical element configured to input the signals spatially split by the first optical element and the input signal of which the propagating direction is changed by the third optical element to the plurality of cores of another multi-core fiber connected to the one node in which the connector is provided.

A connector of an eighteenth aspect of the present invention is a connector used in a node connected to a multi-core fiber in a communication system which includes three or more nodes, the multi-core fiber having a plurality of cores and being used in at least a partial segment of the connection between the nodes, wherein the connector is configured to add and drop a signal to and from allocated cores exclusively allocated as a communication path between the one node in which the connector is provided and another node of the nodes, and a relative positional relationship between a connection position of one of the allocated cores in which a signal is added in the connector and a connection position of another one of the allocated cores in which a signal is dropped in the connector is the same for all of the connectors used in the nodes connected to the multi-core fiber.

According to a nineteenth aspect of the present invention, in the connector of the eighteenth embodiment, the connector relays a signal transmitted through a core other than the allocated cores, the signal being transmitted for communication between the other nodes between multi-core fibers connected to the subject node, and a relative positional relationship among a connection position of one of the allocated cores in which a signal is added in the connector, a connection position of another one of the allocated cores in which a signal is dropped in the connector, and a connection position of the core other than the allocated cores in which a signal is relayed in the connector is the same for all of the connectors used in the nodes connected to the multi-core fiber.

Advantageous Effects of Invention

According to the present invention, it is possible to facilitate adding and dropping of optical signals in nodes connected to a multi-core fiber.

DESCRIPTION OF EMBODIMENTS

Figure 1:
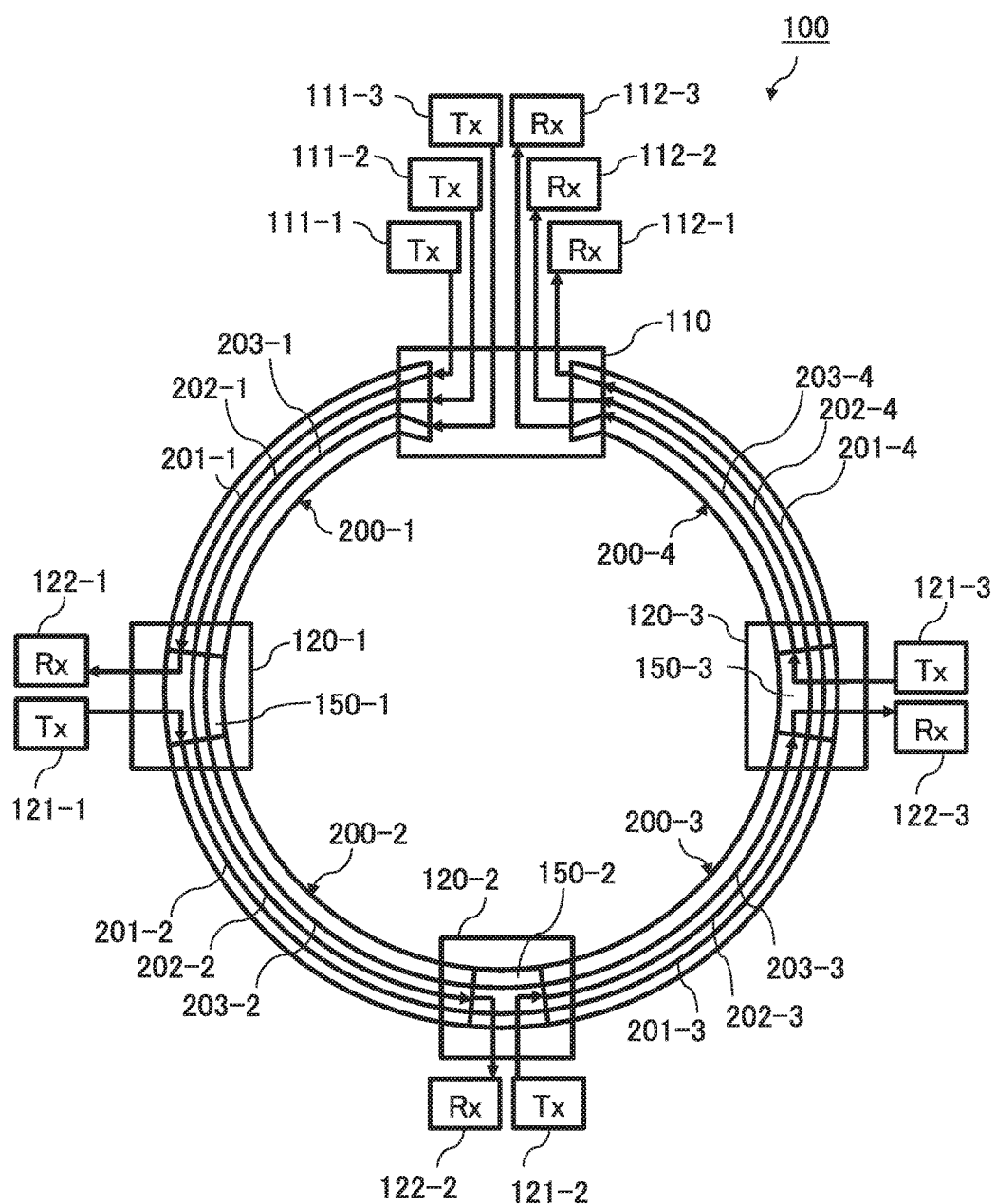
FIG. 1 is a diagram showing a first configuration example of a communication system according to the present invention.

Hereinafter, a communication system and a connector according to an embodiment of the present invention will be described with reference to the drawings. In the following embodiments, elements denoted by the same reference numerals perform similar operations and a redundant description thereof will be omitted appropriately.

First, an example of a communication system to which a connector according to an embodiment of the present invention can be applied and which uses a multi-core fiber (MCF) will be described. FIG. 1 is a diagram showing a configuration example of a communication system 100 which uses MCFs according to the present invention. The communication system 100 includes a transceiving node 110 and n Add/Drop nodes 120, n being an integer of 1 or more. FIG. 1 shows a configuration example of the communication system 100 when n=3. In the following description, the respective n Add/Drop nodes 120 will be referred to as Add/Drop nodes 120-1 to 120-$n$. Moreover, the transceiving node 110 and the Add/Drop node 120 will be collectively referred to as a "node." In the following description, a transmitting device, a receiving device, a transceiving device, and the like that perform communication using optical signals and nodes will be described as individual configurations. However, a node may include a transmitting device, a receiving device, a transceiving device, and the like.

Nodes are connected together by multi-core fibers (MCFs) 200-1 to 200-4. The communication system 100 has a physical topology of a single-system one-way ring configuration in which the nodes are connected together by the MCFs 200-1 to 200-4. The transceiving node 110 and the Add/Drop node 120-1 are connected together by the MCF 200-1. The Add/Drop node 120-1 and the Add/Drop node 120-2 are connected together by the MCF 200-2. The Add/Drop node 120-2 and the Add/Drop node 120-3 are connected together by the MCF 200-3. The Add/Drop node 120-3 and the transceiving node 110 are connected together by the MCF 200-4. Each of the MCFs 200-1 to 200-4 of the communication system 100 has three cores 201, 202, and 203.

To generalize the description of the configuration of the communication system 100, an Add/Drop node 120-$i$ ($1 \leq i \leq n-1$) is connected to an Add/Drop node 120-($i+1$) by an MCF 200-($i+1$). The MCF 200-1 connects together the transceiving node 110 and the Add/Drop node 120-1. The MCF 200-($n+1$) connects together the Add/Drop node 120-$n$ and the transceiving node 110.

Each node of the communication system 100 includes a transmitting device (Tx) and a receiving device (Rx) that perform communication between the nodes. Transmitting devices 111-1 to 111-3 and receiving devices 112-1 to 112-3 are provided in the transceiving node 110. A transmitting device 121-1 and a receiving device 122-1 are provided in the Add/Drop node 120-1. A transmitting device 121-2 and a receiving device 122-2 are provided in the Add/Drop node 120-2. A transmitting device 121-3 and a receiving device 122-3 are provided in the Add/Drop node 120-3. The transmitting devices 111-1 to 111-3 generate optical signals to be transmitted to the Add/Drop nodes 120-1 to 120-3, respectively. The receiving devices 112-1 to 112-3 receive optical signals transmitted from the Add/Drop nodes 120-1 to 120-3 and acquire information included in the optical signals. The transmitting devices 121-1 to 121-3 generate optical signals to be transmitted to the transceiving node 110. The receiving devices 122-1 to 122-3 receive optical signals transmitted from the transceiving node 110 and acquire information included in the optical signals.

The transmitting devices 111-1 to 111-3 generate optical signals addressed to the Add/Drop nodes 120-1 to 120-3, respectively. The three optical signals generated by the transmitting devices 111-1 to 111-3 are added to the cores 201-1 to 203-1 of the MCF 200-1, respectively. The receiving devices 112-1 to 112-3 receive optical signals transmitted from the Add/Drop nodes 120-1, 120-2, and 120-3 to nodes included in the receiving devices, respectively. The receiving devices 112-1 to 112-3 receive optical signals from the Add/Drop nodes 120-1 to 120-3 via the cores 201-4 to 203-4 of the MCF 200-4. A fan-in device or a fan-out device is used for adding optical signals to the MCF 200 and dropping optical signals from the MCF 200 in the transceiving node 110.

The fan-in device is a device which is connected to each of the cores in a multi-core fiber and which adds optical signals to the cores. The fan-out device is a device which is connected to each of the cores in a multi-core fiber and which drops each of optical signals propagating through the cores. Since the only difference between the devices is that the propagating directions of optical signals are different, input and output of optical signals to and from a multi-core fiber may be performed using any one of the fan-in device and the fan-out device. Moreover, adding of optical signals addressed to a multi-core fiber and dropping of optical signals from the multi-core fiber may be performed simultaneously using one device.

Connectors 150-1 to 150-3 are provided in the Add/Drop nodes 120-1 to 120-3, respectively. A connector 150-$i$ of an Add/Drop node 120-$i$ ($i$=1, 2, 3) is connected to an MCF 200-$i$ and an MCF 200-($i$+1). A connector 150-$i$ drops an optical signal addressed to a subject node among the optical signals added in the transceiving node 110 from the MCF 200-$i$. Moreover, the connector 150-$i$ adds optical signals addressed to the transceiving node 110 to the cores of the MCF 200-($i$+1).

In the Add/Drop node 120-1, the connector 150-1 drops an optical signal addressed to the subject node from the core 201-1 of the MCF 200-1. The connector 150-1 connects the dropped optical signal to the receiving device 122-1. Moreover, the connector 150-1 adds an optical signal generated by the transmitting device 121-1 to the core 201-2 of the MCF 200-2. The optical signal added to the core 201-2 is an optical signal transmitted from the Add/Drop node 120-1 to the transceiving node 110.

The connector 150-1 connects the cores 202-1 and 203-1 among the cores of the MCF 200-1 to the cores 202-2 and 203-2 among the cores of the MCF 200-2. The connector 150-1 relays optical signals between the MCF 200-1 and the MCF 200-2. The connector 150-1 relays optical signals transmitted through cores other than the cores 201-1 and 201-2 that add or drop optical signals.

In the Add/Drop node 120-2, the connector 150-2 drops an optical signal addressed to the subject node from the core 202-2 of the MCF 200-2. The connector 150-2 connects the dropped optical signal to the receiving device 122-2. Moreover, the connector 150-2 adds an optical signal generated by the transmitting device 121-2 to the core 202-3 of the MCF 200-3. The optical signal added to the core 202-3 is an optical signal transmitted from the Add/Drop node 120-2 to the transceiving node 110.

The connector 150-2 connects the cores 201-2 and 203-2 among the cores of the MCF 200-2 to the cores 201-3 and 203-3 among the cores of the MCF 200-3. The connector 150-2 relays optical signals between the MCF 200-2 and the MCF 200-3. The connector 150-2 relays optical signals transmitted through cores other than the cores 201-2 and 201-3 that add or drop optical signals.

In the Add/Drop node 120-3, the connector 150-3 drops an optical signal addressed to the subject node from the core 203-3 of the MCF 200-3. The connector 150-3 connects the dropped optical signal to the receiving device 122-3. Moreover, the connector 150-3 adds an optical signal generated by the transmitting device 121-3 to the core 203-4 of the MCF 200-4. The optical signal added to the core 203-4 is an optical signal transmitted from the Add/Drop node 120-3 to the transceiving node 110.

The connector 150-3 connects the cores 201-3 and 202-3 among the cores of the MCF 200-3 to the cores 201-4 and 202-4 among the cores of the MCF 200-4. The connector 150-3 relays optical signals between the MCF 200-3 and the MCF 200-4. The connector 150-3 relays optical signals transmitted through cores other than the cores 203-3 and 203-4 that add or drop optical signals.

Figure 2A:
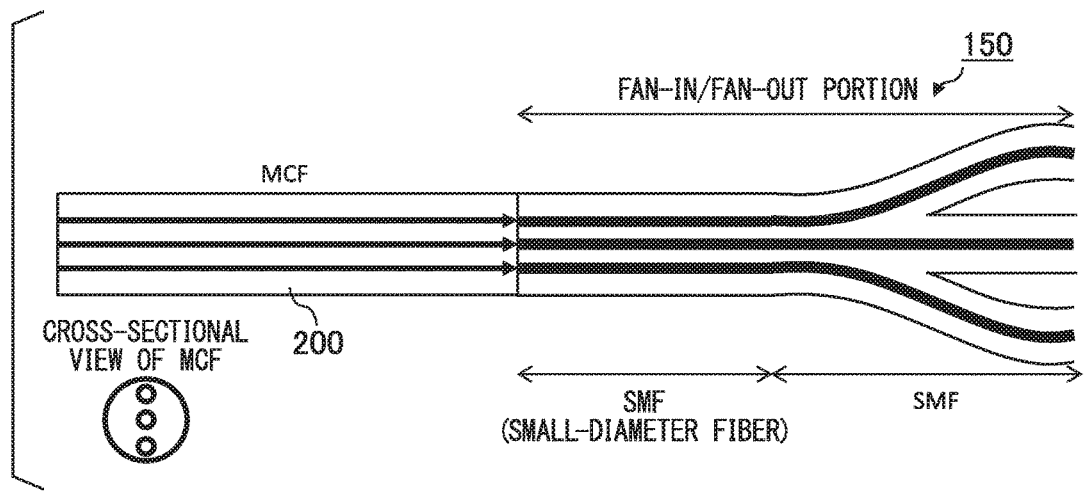
FIG. 2A is a diagram showing a first configuration example of a connector used in a communication system.
Figure 2B:
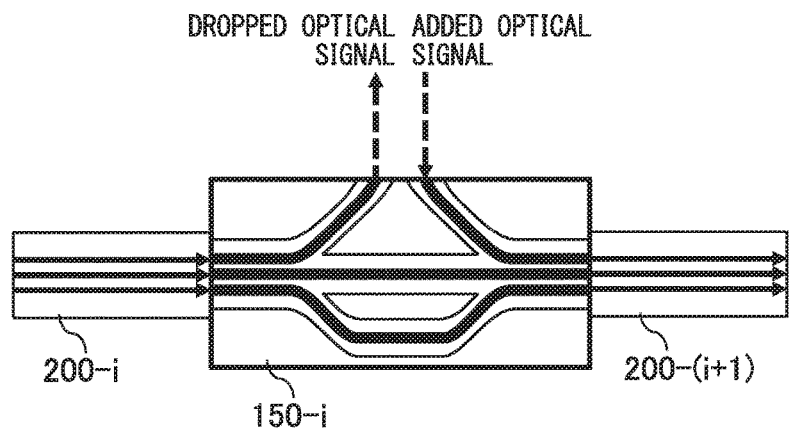
FIG. 2B is a diagram showing the first configuration example of a connector used in a communication system.

FIGS. 2A and 2B are diagrams showing a first configuration example of the connector 150 used in the communication system 100. The connector 150 includes a fan-in/fan-out portion including a plurality of small-diameter single-mode fibers (SMFs) and a plurality of SMFs. As shown in FIG. 2A, the connector 150 includes a small-diameter SMF for each of the cores of a connection target MCF 200. One set of ends of the plurality of small-diameter SMFs are provided at positions facing the cores of the MCF 200. Moreover, the other set of ends of the plurality of small-diameter SMFs are provided at positions facing one set of ends of the SMFs. Each of the small-diameter SMFs connects the SMF and the core of the MCF 200. The connector 150 can drop optical signals transmitted through the respective cores of the MCF 200 via the small-diameter SMF and the SMF. Moreover, by inputting optical signals to the SMF, it is possible to input optical signals to the cores of the MCF 200.

The connector 150-$i$ shown in FIG. 2B connects together the MCF 200-$i$ and the MCF 200-($i$+1). The other set of ends of SMFs corresponding to cores that transmit optical signals which are an Add/Drop target are drawn out to a side surface of the connector 150-$i$. At the other set of ends of the SMFs drawn out to the side surface of the connector 150-$i$, adding and dropping (Add/Drop) of the optical signal can be performed.

The other set of ends of the SMFs corresponding to cores that transmit optical signals which are not the Add/Drop target among the cores of the MCF 200-$i$ and the other set of ends of the SMFs corresponding to cores that transmit optical signals which are not the Add/Drop target among the cores of the MCF 200-($i$+1) are provided at positions facing each other. In the connector 150-$i$, optical signals which are not the Add/Drop target are relayed from the MCF 200-$i$ to the MCF 200-($i$+1) via the small-diameter SMFs and the SMFs.

Figure 3A:
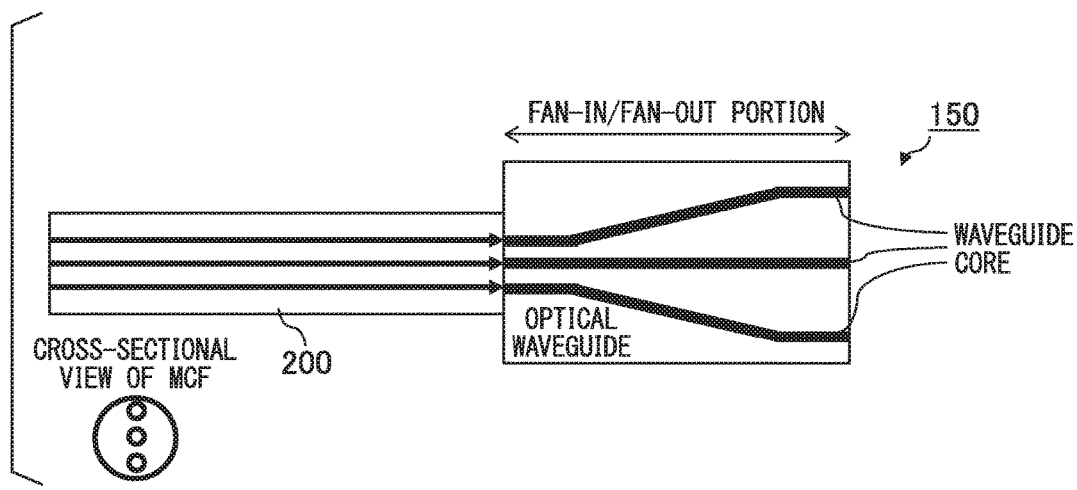
FIG. 3A is a diagram showing a second configuration example of a connector used in a communication system.
Figure 3B:
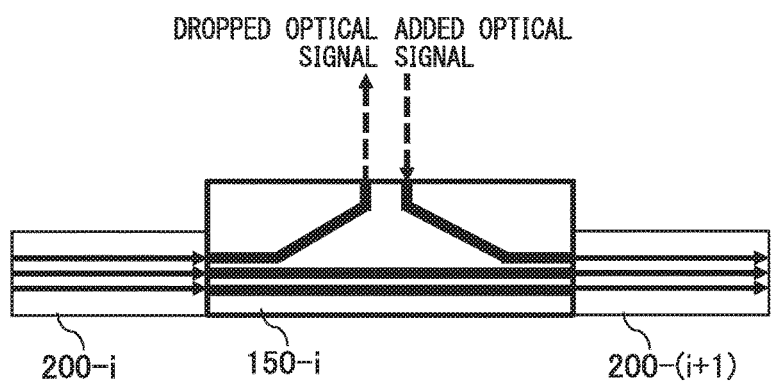
FIG. 3B is a diagram showing the second configuration example of a connector used in a communication system.

FIGS. 3A and 3B are diagrams showing a second configuration example of the connector 150 used in the communication system 100. FIGS. 3A and 3B show a configuration example different from the configuration example of the connector 150 shown in FIGS. 2A and 2B. The connector 150 shown in FIGS. 3A and 3B includes an optical waveguide including a plurality of waveguide cores formed on a glass substrate as a fan-in/fan-out portion. As shown in FIG. 3A, in the connector 150, the plurality of waveguide cores are provided at positions facing the cores of a connection target MCF 200. Optical signals transmitted through the respective cores of the MCF 200 are split via the waveguide cores. Moreover, by adding optical signals to the waveguide cores, it is possible to input optical signals to the respective cores of the MCF 200.

In the connector 150-$i$ shown in FIG. 3B, one set of ends of waveguide cores corresponding to the cores that transmit optical signals which are the Add/Drop target among the cores of the MCF 200-$i$ and the MCF 200-($i$+1) connected together by the connector 150-$i$ are provided at positions facing the cores of the MCFs. The other set of ends of the waveguide cores are provided on a side surface of the connector 150-$i$. At the other set of ends of the waveguide cores positioned on the side surface of the connector 150-$i$, adding and dropping of optical signals can be performed.

One set of ends of the waveguide cores corresponding to the cores that transmit optical signals which are not the Add/Drop target among the cores of the MCF 200-$i$ are provided at positions facing the cores of the MCFs. The other set of ends of the waveguide cores are provided at positions facing the cores that transmit optical signals which are not the Add/Drop target among the cores of the MCF 200-($i$+1). The cores that transmit optical signals which are not the Add/Drop target in the MCF 200-$i$ and the MCF 200-($i$+1) are connected to waveguide cores in a one-to-one relationship. In the connector 150-$i$, the optical signals which are not the Add/Drop target are relayed from the cores of the MCF 200-$i$ to the cores of the MCF 200-($i$+1) via the waveguide cores.

The waveguide cores may be formed in a three-dimensional space as disclosed in Reference Document 1 as well as being formed in a two-dimensional space of a substrate plane.

REFERENCE DOCUMENT 1

R. R. Thomson, et al., "Ultrafast-laser inscription of a three dimensional fan-out device for multicore fiber coupling applications," Optics Express, OSA Publishing, 2007, Vol. 15, Issue 18, p. 11691-11697

Figure 4A:
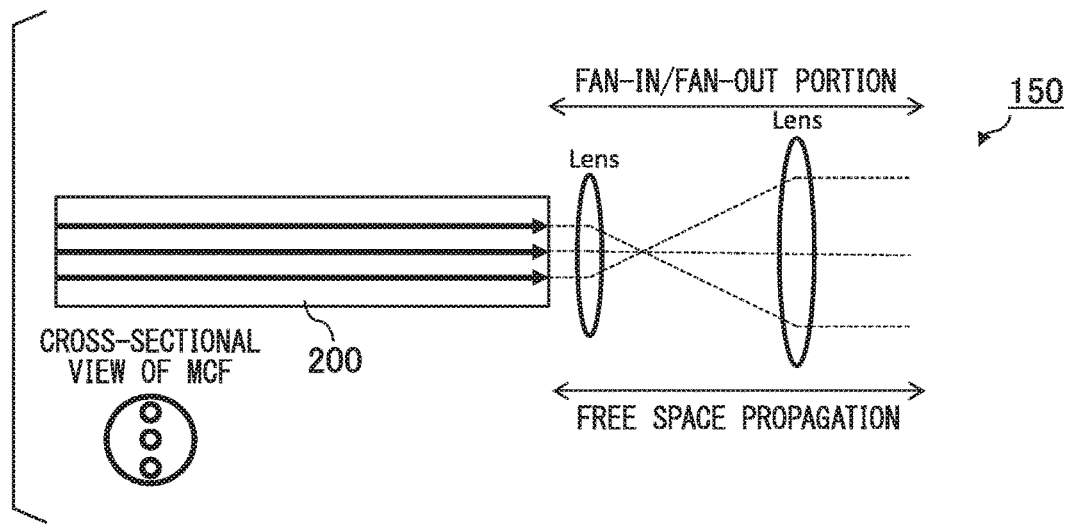
FIG. 4A is a diagram showing a third configuration example of a connector used in a communication system.
Figure 4B:
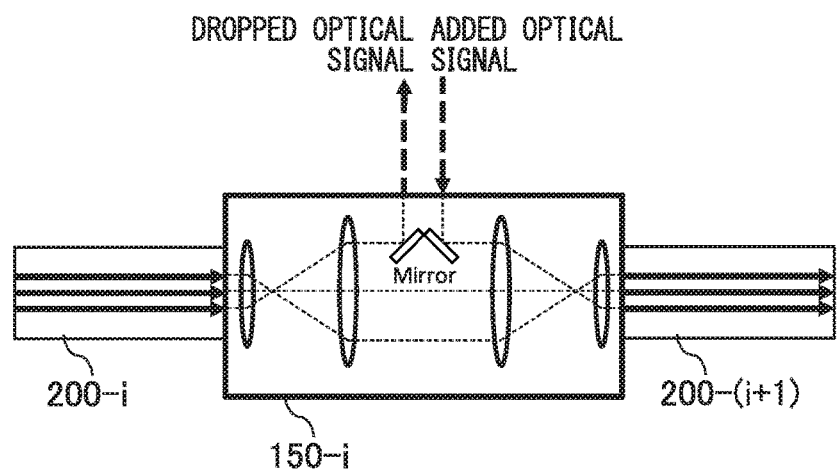
FIG. 4B is a diagram showing the third configuration example of a connector used in a communication system.

FIGS. 4A and 4B are diagrams showing a third configuration example of the connector 150 used in the communication system 100. FIGS. 4A and 4B show a configuration example different from the configuration example of the connector 150 shown in FIGS. 2A, 2B, 3A, and 3B. The connector 150 shown in FIGS. 4A and 4B causes optical signals transmitted through the respective cores of the MCF 200 to be output to a free space and causes the optical signals of the respective cores in the free space to be split by an optical system. For example, as shown in FIG. 4A, the connector 150 includes a fan-in/fan-out portion formed of two lenses. The optical signals transmitted through the respective cores of the MCF 200 are output to the free space and are split by being refracted by the two lenses. Add/Drop of optical signals is performed using an optical system. Connection of two MCFs 200 via a free space is disclosed in Reference Document 2, for example.

REFERENCE DOCUMENT 2

W. Klaus, et al., "Free-Space Coupling Optics for Multicore Fibers," Photonics Technology Letters, IEEE, September 2012, Volume 24, Issue 21, p. 1902-1905

FIG. 4B is a diagram showing a configuration example of the connector 150-$i$. In the connector 150-$i$ shown in FIG. 4B, the optical signals output from the respective cores of the MCF 200-$i$ are collimated by an optical system (a collimator) formed by combining two lenses. Moreover, the collimated optical signals are input to the respective cores of the MCF 200-($i$+1). A mirror that changes an optical path toward a side surface of the connector 150-$i$ is disposed in an optical path of optical signals which are the Add/Drop target. A splitting target optical signal among the optical signals which are converted to parallel light by the optical system is reflected from a mirror and is dropped to the outside of the connector 150-$i$, whereby the splitting target optical signal can be obtained. Moreover, by causing optical signals input from the outside of the connector 150-$i$ to strike the mirror, the optical signals reflected from the mirror are incident on the optical system obtained by combining two lenses together with the collimated optical signals. When the optical signals incident on the optical system are connected to the cores of the MCF 200-($i$+1), Add target optical signals can be added to the cores.

Optical signals which are not the Add/Drop target are bundled together with the added optical signals after being split by the optical system and are input to the respective cores of the MCF 200-($i$+1). In the connector 150-$i$, the optical signals which are not the Add/Drop target are relayed from the MCF 200-$i$ to the MCF 200-($i$+1) via a free space. Although two lenses are used for collimating light output from the fiber and a mirror is used for changing the propagating direction of light in the free space in the drawings, an optical device having the same function may be used.

Although FIGS. 2A, 2B, 3A, 3B, 4A, and 4B show a configuration example of the connector 150, the connector 150 may be realized using a medium and a method other than those described above. For example, a planar lightwave circuit (PLC) having an optical waveguide formed on silicon may be used as a connector.

In the communication system 100, optical signals generated by the transmitting device 111-1 of the transceiving node 110 are received by the receiving device 122-1 of the Add/Drop node 120-1 via the core 201-1 of the MCF 200-1 and the connector 150-1. The optical signals generated by the transmitting device 111-2 are received by the receiving device 122-2 of the Add/Drop node 120-2 via the core 202-1 of the MCF 200-1, the connector 150-1, the core 202-2 of the MCF 200-2, and the connector 150-2. The optical signals generated by the transmitting device 111-3 are received by the receiving device 122-3 of the Add/Drop node 120-3 via the core 203-1 of the MCF 200-1, the connector 150-1, the core 203-2 of the MCF 200-2, the connector 150-2, the core 203-3 of the MCF 200-3, and the connector 150-3.

Moreover, the optical signals generated by the transmitting device 121-1 of the Add/Drop node 120-1 are received by the receiving device 112-1 of the transceiving node 110 via the connector 150-1, the core 201-2 of the MCF 200-2, the connector 150-2, the core 201-3 of the MCF 200-3, the connector 150-3, and the core 201-4 of the MCF 200-4. The optical signals generated by the transmitting device 121-2 of the Add/Drop node 120-2 are received by the receiving device 112-2 of the transceiving node 110 via the connector 150-2, the core 202-3 of the MCF 200-3, the connector 150-3, and the core 202-4 of the MCF 200-4. The optical signals generated by the transmitting device 121-3 of the Add/Drop node 120-3 are received by the receiving device 112-3 of the transceiving node 110 via the connector 150-3 and the core 203-4 of the MCF 200-4.

In the communication system 100, the transceiving node 110 has communication paths for transmitting and receiving signals to and from the Add/Drop nodes 120-1 to 120-3. The communication system 100 has a star-type logical topology around the transceiving node 110.

For example, by connecting together the MCFs 200 at each nodes using any one of the connectors 150 shown in FIGS. 2A, 2B, 3A, 3B, 4A, and 4B, it is possible to add and drop optical signals to and from predetermined cores among a plurality of cores included in the MCF 200. In the communication system 100, by connecting the MCF 200-$i$ and the MCF 200-($i$+1) via the connector 150-$i$, it is possible to easily drop optical signals addressed to the Add/Drop node 120-$i$ and add optical signals addressed to the transceiving node 110. Since a process of dividing multiplexed optical signals having different wavelengths in respective wavelengths is not required in adding or dropping optical signals, it is possible to reduce the time and labor required for installation and maintenance of devices in the Add/Drop node 120.

Although a case in which the MCF 200 has three cores has been described, the MCF 200 may have four or more cores. When the MCF 200 has four or more cores, optical signals may be added and dropped for two or more cores of the Add/Drop node 120.

Figure 5:
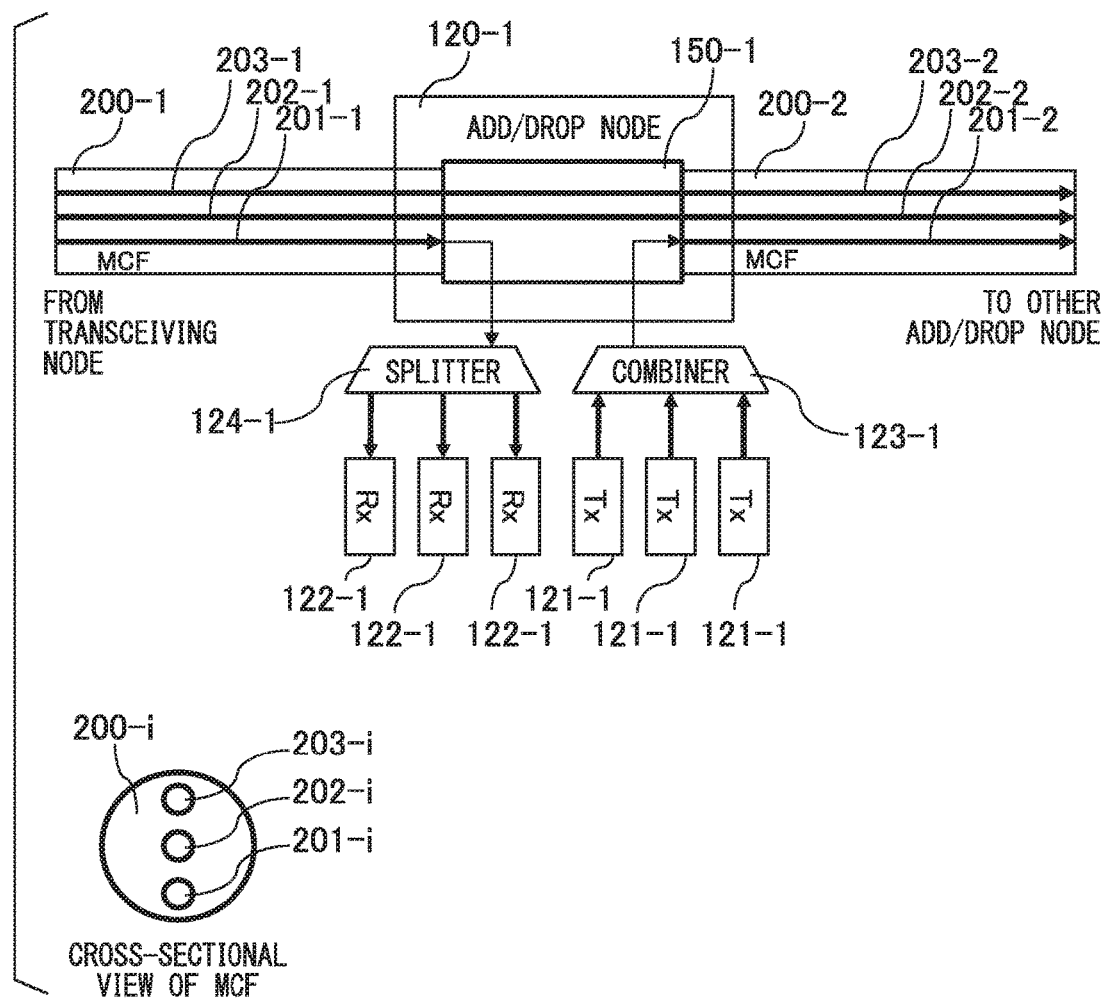
FIG. 5 is a diagram showing a configuration example of an Add/Drop node when WDM transmission is performed in a communication system.

Moreover, WDM transmission may be performed in each core of the MCF 200. When WDM transmission is performed, optical signals of respective wavelengths need to be split and combined in the Add/Drop node 120. FIG. 5 is a diagram showing a configuration example of the Add/Drop node 120-1 when the communication system 100 performs WDM transmission. The Add/Drop node 120-1 includes a connector 150-1, a splitter 124-1, a combiner 123-1, a plurality of receiving devices 122-1, and a plurality of transmitting devices 121-1.

An optical signal dropped from the core 201-1 of the MCF 200-1 of the connector 150-1 is input to the splitter 124-1. The splitter 124-1 splits the input optical signal in respective wavelengths. The optical signals obtained by splitting are received by the receiving devices 122-1, respectively. The optical signals having different wavelengths generated by the plurality of transmitting devices 121-1 are input to the combiner 123-1. The combiner 123-1 combines the input optical signals and outputs the combined optical signal to the connector 150-1. The connector 150-1 connects the optical signal input from the combiner 123-1 to the core 201-2 of the MCF 200-2 to add the optical signal addressed to the transceiving node 110 to the MCF 200-2.

Even when WDM transmission is performed, the optical signals of the cores 202-1 and 203-1 of the MCF 200-1, which are not the Add/Drop target, are relayed to the cores 202-2 and 203-2 of the MCF 200-2. Due to this, as for optical signals to be relayed, it is not necessary to split and combine optical signals in respective wavelengths at the each Add/Drop node. When WDM transmission is performed, the other Add/Drop nodes 120 have a configuration similar to that of the Add/Drop node 120-1.

Figure 6:
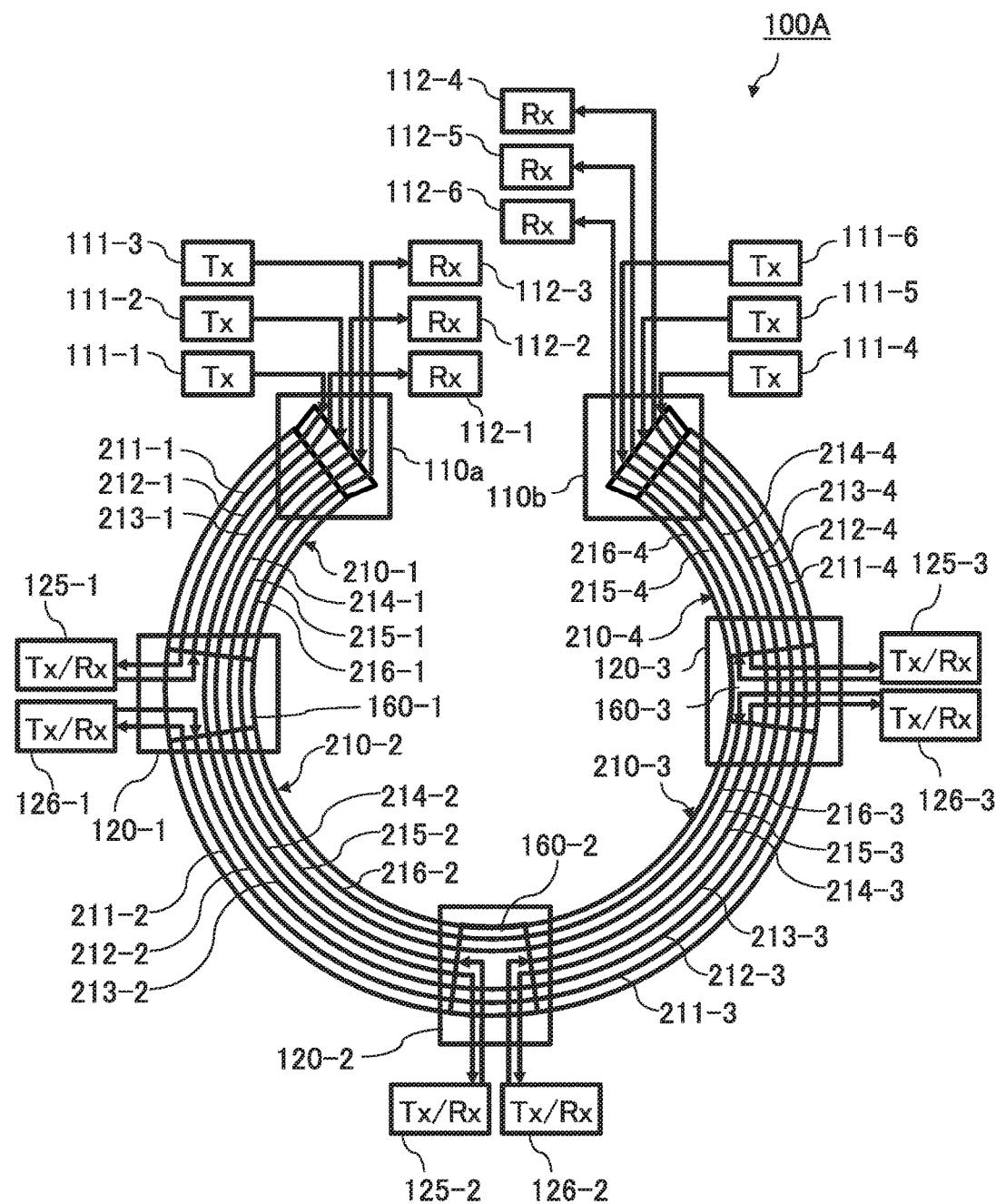
FIG. 6 is a diagram showing a second configuration example of the communication system according to the present invention.

A communication system having a different configuration from the communication system 100 shown in FIG. 1 will be described. FIG. 6 is a diagram showing a configuration example of a communication system 100A which uses the MCF according to the present invention. The communication system 100A includes transceiving nodes 110a and 110b and *n* Add/Drop nodes 120. FIG. 6 shows a configuration example of the communication system 100A when n=3. The communication system 100A is different from the communication system 100 in that the communication system 100A has a physical topology of a dual-system one-way ring configuration.

Nodes are connected together by MCFs 210-1 to 210-4. The transceiving node 110a and the Add/Drop node 120-1 are connected together by the MCF 210-1. The Add/Drop node 120-1 and the Add/Drop node 120-2 are connected together by the MCF 210-2. The Add/Drop node 120-2 and the Add/Drop node 120-3 are connected together by the MCF 210-3. The Add/Drop node 120-3 and the transceiving node 110b are connected together by the MCF 210-4. The MCFs 210-1 to 210-4 of the communication system 100A include six cores 211 to 216.

When the description of the configuration of the communication system 100A is generalized, an Add/Drop node 120-*i* (1≤i≤n−1) is connected to an Add/Drop node 120-(*i*+1) by an MCF 210-(*i*+1). The MCF 210-1 connects together the transceiving node 110a and the Add/Drop node 120-1. The MCF 210-(*n*+1) connects together the Add/Drop node 120-*n* and the transceiving node 110b.

Each node of the communication system 100A includes either a transmitting device (Tx) and a receiving device (Rx) that perform communication between nodes or a transceiving device (Tx/Rx). Transmitting devices 111-1 to 111-3 and receiving devices 112-1 to 112-3 are provided in the transceiving node 110a. Transceiving devices 125-1 and 126-1 are provided in the Add/Drop node 120-1. Transceiving devices 125-2 and 126-2 are provided in the Add/Drop node 120-2. Transceiving devices 125-3 and 126-3 are provided in the Add/Drop node 120-3. Transmitting devices 111-4 to 111-6 and receiving devices 112-4 to 112-6 are provided in the transceiving node 110b. In the configuration example of the communication system 100A shown in FIG. 6, a configuration in which the transmitting device 111 and the receiving device 112 are provided in the transceiving nodes 110a and 110b, and the transceiving devices 125 and 126 are provided in the Add/Drop nodes 120-1 to 120-3 will be described. However, the transceiving devices 125 and 126 have the functions of both a transmitting device and a receiving device therein, and there is no great difference between the transceiving device and a combination of the transmitting device and the receiving device. Either a transmitting device and a receiving device or a transceiving device may be provided in the transceiving nodes 110a and 110b and the Add/Drop nodes 120-1 to 120-3.

The transmitting devices 111-1 to 111-3 generate optical signals to be transmitted to the Add/Drop nodes 120-1 to 120-3, respectively. The optical signals generated by the transmitting devices 111-1 to 111-3 are added to the cores 211-1, 213-1, and 215-1 of the MCF 210-1, respectively. The receiving devices 112-1 to 112-3 receive optical signals transmitted from the Add/Drop nodes 120-1 to 120-3 to the transceiving node 110a, respectively. The receiving devices 112-1 to 112-3 receive optical signals from the cores 212-1, 214-1, and 216-1 of the MCF 210-1, respectively.

The transmitting devices 111-4 to 111-6 generate optical signals to be transmitted to the Add/Drop nodes 120-1 to 120-3, respectively. The optical signals generated by the transmitting devices 111-4 to 111-6 are added to the cores 211-4, 213-4, and 215-4 of the MCF 210-4, respectively. The receiving devices 112-4 to 112-6 receive optical signals transmitted from the Add/Drop nodes 120-1 to 120-3 to the transceiving node 110b, respectively. The receiving devices 112-4 to 112-6 receive optical signals from the cores 212-4, 214-4, and 216-4 of the MCF 210-4, respectively. In the transceiving nodes 110a and 110b, a fan-in device or a fan-out device is used for adding optical signals to the MCF 200 and dropping optical signals from the MCF 200.

A connector 160-*i* is provided in each Add/Drop node 120-*i* (i=1, 2, 3). The connector 160-*i* is connected to the MCF 210-*i* and the MCF 210-(*i*+1). The connector 160-*i* drops optical signals addressed to the subject node among the optical signals added in the transceiving nodes 110a and 110b from the MCF 210-*i* and the MCF 210-(*i*+1). The connector 160-*i* adds an optical signal addressed to the transceiving node 110a to the cores of the MCF 210-*i*. The connector 160-*i* adds an optical signal addressed to the transceiving node 110b to the cores of the MCF 210-(*i*+1).

In the Add/Drop node 120-1, the connector 160-1 drops an optical signal addressed to the subject node from the core 211-1 of the MCF 210-1. The connector 160-1 connects the dropped optical signal to the transceiving device 125-1. Moreover, the connector 160-1 adds an optical signal generated by the transceiving device 125-1 to the core 212-1 of the MCF 210-1. The optical signal added to the core 212-1 is an optical signal which is transmitted from the subject node to the transceiving node 110a.

Furthermore, the connector 160-1 drops an optical signal addressed to the subject node from the core 211-2 of the MCF 210-2. The connector 160-1 connects the dropped optical signal to the transceiving device 126-1. Moreover, the connector 160-1 adds an optical signal generated by the transceiving device 126-1 to the core 212-2 of the MCF 210-2. The optical signal added to the core 212-2 is an optical signal which is transmitted from the subject node to the transceiving node 110b.

The connector 160-1 connects the cores 213-1 to 216-1 among the cores of the MCF 210-1 to the cores 213-2 to 216-2 among the cores of the MCF 210-2, respectively. The connector 160-1 relays optical signals between the MCF 210-1 and the MCF 210-2. The connector 160-1 relays optical signals transmitted through cores other than the cores 211-1, 212-1, 211-2, and 212-2 through which optical signals are added or dropped.

In the Add/Drop node 120-2, the connector 160-2 drops an optical signal addressed to the subject node from the core 213-2 of the MCF 210-2. The connector 160-2 connects the dropped optical signal to the transceiving device 125-2. Moreover, the connector 160-2 adds an optical signal generated by the transceiving device 125-2 to the core 214-2 of the MCF 210-2. The optical signal added to the core 214-2 is an optical signal which is transmitted from the subject node to the transceiving node 110a.

Furthermore, the connector 160-2 drops an optical signal addressed to the subject node from the core 213-3 of the MCF 210-3. The connector 160-2 connects the dropped optical signal to the transceiving device 126-2. Moreover, the connector 160-2 adds an optical signal generated by the transceiving device 126-2 to the core 214-3 of the MCF 210-3. The optical signal added to the core 214-3 is an optical signal which is transmitted from the subject node to the transceiving node 110b.

The connector 160-2 connects the cores 211-2, 212-2, 215-2, and 216-2 among the cores of the MCF 210-2 to the cores 211-3, 212-3, 215-3, and 216-3 among the cores of the MCF 210-3, respectively. The connector 160-2 relays optical signals between the MCF 210-2 and the MCF 210-3. The connector 160-2 relays optical signals transmitted through cores other than the cores 213-2, 214-2, 213-3, and 214-3 through which optical signals are added or dropped.

In the Add/Drop node 120-3, the connector 160-3 drops an optical signal addressed to the subject node from the core 215-3 of the MCF 210-3. The connector 160-3 connects the dropped optical signal to the transceiving device 126-3. Moreover, the connector 160-3 adds an optical signal generated by the transceiving device 126-3 to the core 216-3 of the MCF 210-3. The optical signal added to the core 216-3 is an optical signal which is transmitted from the subject node to the transceiving node 110a.

Furthermore, the connector 160-3 drops an optical signal addressed to the subject node from the core 215-4 of the MCF 210-4. The connector 160-4 connects the dropped optical signal to the transceiving device 125-3. Moreover, the connector 160-3 adds an optical signal generated by the transceiving device 125-3 to the core 216-3 of the MCF 210-4. The optical signal added to the core 216-4 is an optical signal which is transmitted from the subject node to the transceiving node 110b.

The connector 160-3 connects the cores 211-3 to 214-3 among the cores of the MCF 210-3 to the cores 211-4 to 214-4 among the cores of the MCF 210-4, respectively. The connector 160-3 relays optical signals between the MCF 210-3 and the MCF 210-4. The connector 160-3 relays optical signals transmitted through cores other than the cores 215-3, 216-3, 215-4, and 216-4 through which optical signals are added or dropped.

The connectors 160-1 to 160-3 of the communication system 100A can be configured similarly to the connectors 150-1 to 150-3 of the communication system 100 by using the small-diameter fiber, the optical waveguide, the optical system, and the like as shown in FIGS. 2A, 2B, 3A, 3B, 4A, and 4B.

In the communication system 100A, a transmission communication paths and a reception communication paths are formed between the transceiving nodes 110a and 110b and the Add/Drop nodes 120-1 to 120-3. The transceiving nodes 110a and 110b can communicate with the Add/Drop nodes 120-1 to 120-3 individually. In this manner, the communication system 100A has a tree-type logical topology in which the transceiving nodes 110a and 110b are used as root nodes.

The Add/Drop nodes 120-1 to 120-3 may use any one of the communication paths directed to the two transceiving nodes 110a and 110b as an active system (0-system) and use the other as a standby system (1-system). Moreover, the Add/Drop nodes 120-1 to 120-3 may use a communication path of the shorter transmission path as the 0-system and use a communication path of the longer transmission path as the 1-system. In the Add/Drop nodes 120-1 to 120-3, since a process of dividing multiplexed optical signals having different wavelengths in respective wavelengths is not required in adding or dropping optical signals, it is possible to reduce the time and labor required for installation and maintenance of devices.

Although a case in which each MCF 210 has six cores 211 to 216 has been described, the MCF 210 may have seven or more cores. When the MCF 210 has seven or more cores, optical signals may be added and dropped for two or more cores of the Add/Drop node 120.

Moreover, WDM transmission may be performed in each core of the MCF 210. When WDM transmission is performed, as shown in FIG. 5, a splitter or a combiner for optical signals to be added or dropped is provided in each Add/Drop node 120.

Moreover, the transceiving node 110a and the transceiving node 110b may be connected together using the MCF 210 or a MCF having seven or more cores. In the communication system 100A, when the roles of the transceiving nodes 110a and 110b and the Add/Drop nodes 120-1 to 120-3 are changed, a logical topology can be easily changed by attaching a connector to the transceiving nodes 110a and 110b and replacing the connector 150 of each of the Add/Drop nodes 120-1 to 120-3 with another connector. In this way, it is possible to flexibly cope with a change in the network configuration.

Figure 7:
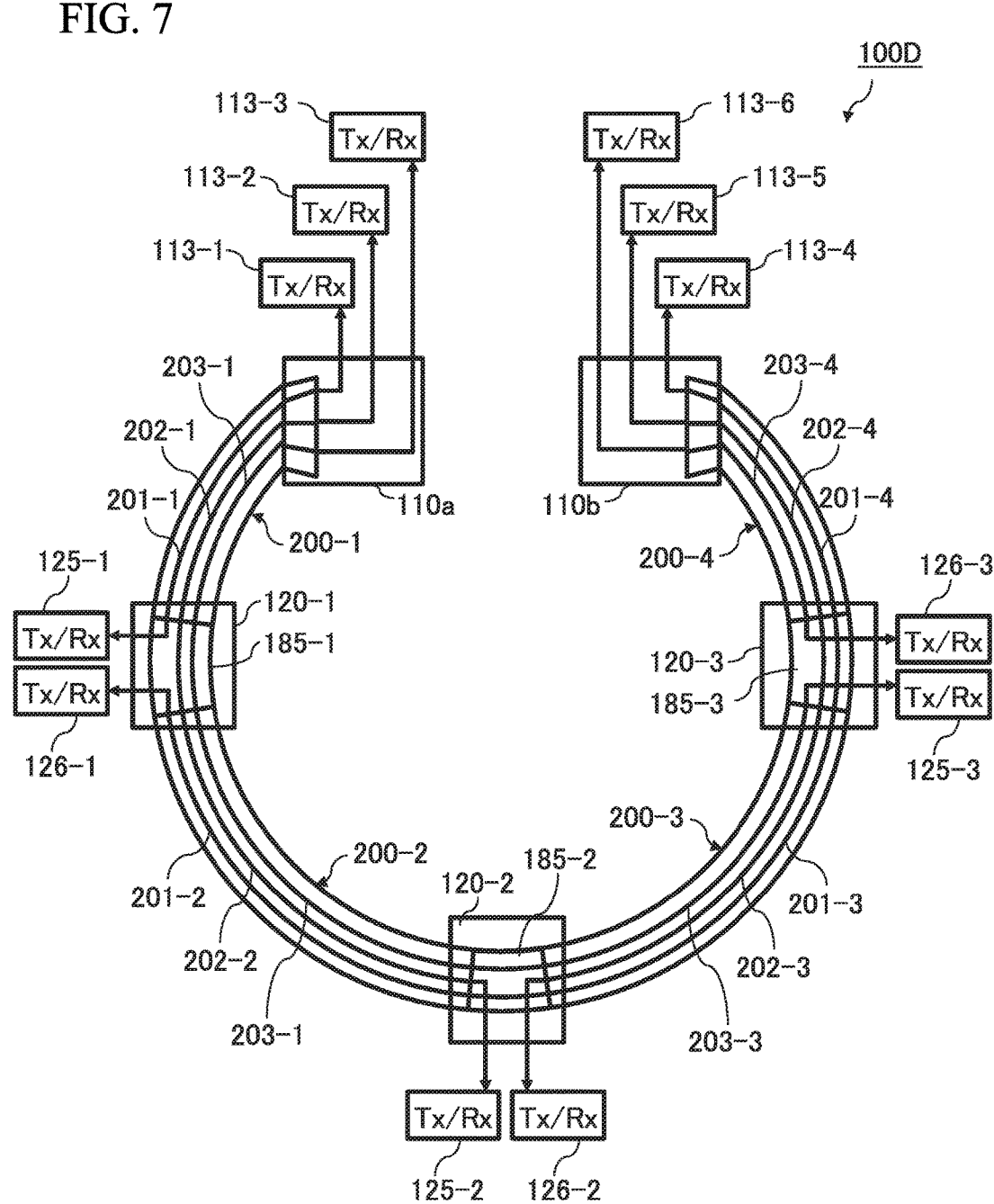
FIG. 7 is a diagram showing a third configuration example of the communication system according to the present invention.

A communication system having a different configuration from the communication systems shown in FIGS. 1 and 6 will be described. FIG. 7 is a diagram showing a configuration example of a communication system 100D which uses the MCFs according to the present invention. The communication system 100D includes transceiving nodes 110a and 110b and n Add/Drop nodes 120. FIG. 7 shows a configuration example of the communication system 100D when n=3. In the communication system 100D, the connection of the MCFs 200-1 to 200-4 between nodes is similar to the connection of the MCFs 210-1 to 210-4 in the communication system 100A. In the communication system 100D, communication from the transceiving nodes 110a and 110b to the Add/Drop nodes 120 and communication from the Add/Drop nodes 120 to the transceiving nodes 110a and 110b are performed using the same core. The communication system 100D has a physical topology of a dual-system two-way ring configuration.

Each node of the communication system 100D includes a transceiving device (Tx/Rx) that performs communication between nodes. Transceiving devices 113-1 to 113-3 are provided in the transceiving node 110a. Transceiving devices 113-4 to 113-6 are provided in the transceiving node 110b. Transceiving devices 125-1 to 125-3 and 126-1 to 126-3 are provided in the Add/Drop nodes 120-1 to 120-3, respectively. The transceiving devices 113-1 to 113-6 generate optical signals to be transmitted to the Add/Drop nodes 120-1 to 120-3, respectively. The transceiving devices 125-1 to 125-3 generate optical signals to be transmitted to the transceiving node 110a. The transceiving devices 126-1 to 126-3 generate optical signals to be transmitted to the transceiving node 110b. Moreover, the transceiving devices 113-1 to 113-6 receive optical signals transmitted from the Add/Drop nodes 120-1 to 120-3, respectively, and acquire information included in the optical signals. The transceiving devices 125-1 to 125-3 receive optical signals transmitted from the transceiving node 110a and acquire information included in the optical signals. The transceiving devices 126-1 to 126-3 receive optical signals transmitted from the transceiving node 110b and acquire information included in the optical signals.

In the transceiving node 110a, the transceiving devices 113-1 to 113-3 generate optical signals to be transmitted to the Add/Drop nodes 120-1 to 120-3, respectively. Three optical signals generated by the transceiving devices 113-1 to 113-3 are added to the cores 201-1 to 203-1 of the MCF 200-1, respectively. Moreover, the transceiving devices 113-1 to 113-3 receive optical signals from the Add/Drop nodes 120-1 to 120-3 via the cores 201-1 to 203-1 of the MCF 200-1, respectively. A fan-in device or a fan-out device is used for adding optical signals to the MCF 200-1 and dropping optical signals from the MCF 200-1.

In the transceiving node 110b, the transceiving devices 113-4 to 113-6 generate optical signals to be transmitted to the Add/Drop nodes 120-1 to 120-3, respectively. Three optical signals generated by the transceiving devices 113-4 to 113-6 are added to the cores 201-4 to 203-4 of the MCF 200-4, respectively. Moreover, the transceiving devices 113-4 to 113-6 receive optical signals from the Add/Drop nodes 120-1 to 120-3 via the cores 201-4 to 203-4 of the MCF 200-4, respectively. A fan-in device or a fan-out device is used for adding optical signals to the MCF 200-4 and dropping optical signals from the MCF 200-4 similarly to the transceiving node 110a.

A connector 185-$i$ is provided in each Add/Drop node 120-$i$ ($i$=1, 2, 3). The connector 185-$i$ is connected to the MCF 200-$i$ and the MCF 200-($i$+1). The connector 185-$i$ drops an optical signal from the core 20$i$-$i$ of the MCF 200-$i$ and connects to the dropped optical signal to the transceiving device 125-$i$. The connector 185-$i$ adds an optical signal generated by the transceiving device 125-$i$ to the core 20$i$-$i$ of the MCF 200-$i$. The optical signal generated by the transceiving device 125-$i$ is an optical signal which is transmitted from the Add/Drop node 120-$i$ to the transceiving node 110a.

Moreover, the connector 185-$i$ drops an optical signal from the core 20$i$-($i$+1) of the MCF 200-($i$+1) and connects the dropped optical signal to the transceiving device 126-$i$. The connector 185-$i$ adds an optical signal generated by the transceiving device 126-$i$ to the core 20$i$-($i$+1) of the MCF 200-($i$+1). The optical signal generated by the transceiving device 126-$i$ is an optical signal which is transmitted from the Add/Drop node 120-$i$ to the transceiving node 110b.

Moreover, the connector 185-$i$ connects together the core 20$i$-$i$ and the core 20$i$-($i$+1) other than the cores which are the Add/Drop target among the cores of the MCF 200-$i$ and the cores of the MCF 200-($i$+1) to relay optical signals.

The transceiving node 110a and the Add/Drop node 120-1 perform two-way communication using a communication path formed by the core 201-1. The transceiving node 110a and the Add/Drop node 120-2 perform two-way communication using a communication path formed by the cores 202-1 and 202-2. The transceiving node 110a and the Add/Drop node 120-3 perform two-way communication using a communication path formed by the cores 203-1, 203-2, and 203-3.

The transceiving node 110b and the Add/Drop node 120-1 perform two-way communication using a communication path formed by the cores 201-4, 201-3, and 201-2. The transceiving node 110b and the Add/Drop node 120-2 perform two-way communication using a communication path formed by the cores 202-4 and 202-3. The transceiving node 110b and the Add/Drop node 120-3 perform two-way communication using a communication path formed by the core 203-4.

In this manner, the communication system 100D has a tree-type logical topology in which the transceiving nodes 110a and 110b are used as root nodes and can communicate with each of the Add/Drop nodes 120-1 to 120-3. In the communication system 100D, each of the Add/Drop nodes 120-1 to 120-3 can communicate with the transceiving nodes 110a and 110b. The Add/Drop nodes 120-1 to 120-3 may use any one of the communication paths directed to the two transceiving nodes 110a and 110b as an active system (0-system) and use the other as a standby system (1-system). Moreover, the Add/Drop nodes 120-1 to 120-3 may use a communication path of the shorter transmission path as the 0-system and use a communication path of the longer transmission path as the 1-system.

In the communication system 100D, the transceiving node 110a and the transceiving node 110b may be connected together using the MCF 200 or an MCF having four or more cores. In the communication system 100D, when the roles of the transceiving nodes 110a and 110b and the Add/Drop nodes 120-1 to 120-3 are changed, a logical topology can be easily changed by attaching a connector to the transceiving nodes 110a and 110b and replacing the connector 185 of each of the Add/Drop nodes 120-1 to 120-3 with another connector. In this way, it is possible to flexibly cope with a change in the network configuration.

Figure 8:
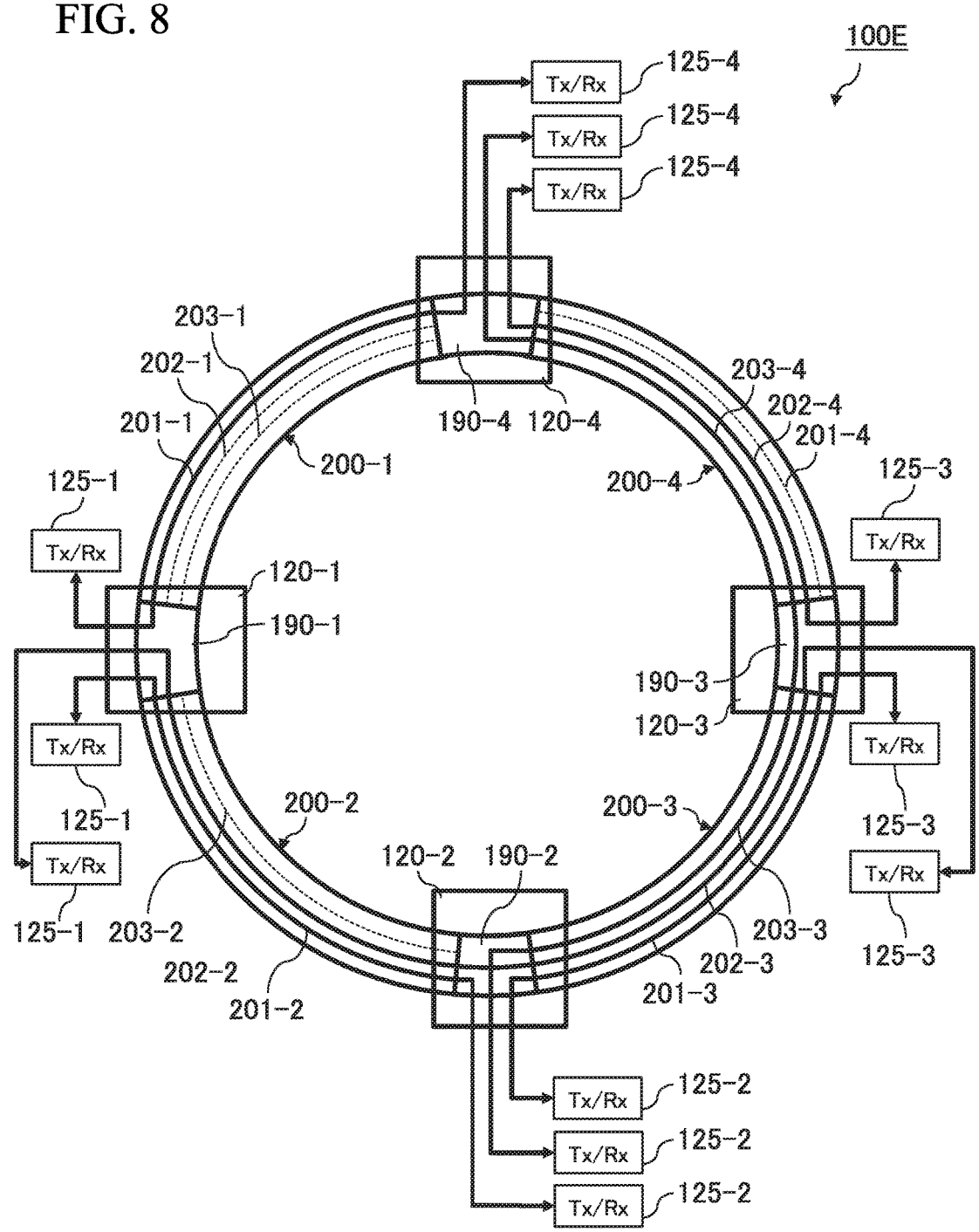
FIG. 8 is a diagram showing a fourth configuration example of the communication system according to the present invention.

A communication system having a different configuration from the communication systems shown in FIGS. 1, 6, and 7 will be described. FIG. 8 is a diagram showing a configuration example of a communication system 100E which uses the MCFs according to the present invention. The communication system 100E has a physical topology of a ring configuration and has a perfect mesh-type logical topology. The communication system 100E includes n Add/Drop nodes 120. FIG. 8 shows a configuration example of the communication system 100E when n=4.

Nodes are connected together by MCFs 200-1 to 200-4. The Add/Drop node 120-1 and the Add/Drop node 120-2 are connected together by the MCF 200-2. The Add/Drop node 120-2 and the Add/Drop node 120-3 are connected together by the MCF 200-3. The Add/Drop node 120-3 and the Add/Drop node 120-4 are connected together by the MCF 200-4. The Add/Drop node 120-4 and the Add/Drop node 120-1 are connected together by the MCF 200-1. The MCFs 200-1 to 200-4 connecting the nodes each have three cores 201, 202, and 203.

Three transceiving devices (Tx/Rx) 125-$i$ for communicating with other Add/Drop nodes 120 and a connector 190-$i$ are provided in each Add/Drop node 120-$i$ (i=1, 2, 3, 4). The transceiving device 125-$i$ is provided so as to correspond to a communication counterpart Add/Drop node 120. The connector 190-1 is connected to the MCF 200-1 and the MCF 200-2. The connector 190-2 is connected to the MCF 200-2 and the MCF 200-3. The connector 190-3 is connected to the MCF 200-3 and the MCF 200-4. The connector 190-4 is connected to the MCF 200-4 and the MCF 200-1.

In the Add/Drop node 120-1, the connector 190-1 drops an optical signal from the core 201-1 of the MCF 200-1 and connects the dropped optical signal to the transceiving device 125-1 that communicates with the Add/Drop node 120-4. The connector 190-1 adds an optical signal generated by the transceiving device 125-1 that communicates with the Add/Drop node 120-4 to the core 201-1 of the MCF 200-1. Moreover, the connector 190-1 drops an optical signal from the core 202-2 of the MCF 200-2 and connects the dropped optical signal to the transceiving device 125-1 that communicates with the Add/Drop node 120-3. The connector 190-1 adds an optical signal generated by the transceiving device 125-1 that communicates with the Add/Drop node 120-3 to the core 202-2 of the MCF 200-2. Moreover, the connector 190-1 drops an optical signal from the core 201-2 of the MCF 200-2 and connects the dropped optical signal to the transceiving device 125-1 that communicates with the Add/Drop node 120-2. The connector 190-1 adds an optical signal generated by the transceiving device 125-1 that communicates with the Add/Drop node 120-2 to the core 201-2 of the MCF 200-2.

In the Add/Drop node 120-2, similarly to the connector 190-1, the connector 190-2 adds and drops optical signals to and from the core 201-2 of the MCF 200-2 and the cores 201-3 and 202-3 of the MCF 200-3. The connector 190-2 connects the dropped optical signals to the transceiving devices 125-2 that communicate with the Add/Drop nodes 120-1, 120-3, and 120-4. Moreover, the connector 190-2 adds optical signals generated by the transceiving devices 125-2 that communicate with the Add/Drop nodes 120-1, 120-3, and 120-4 to the core 201-2 of the MCF 200-2 and the cores 201-3 and 202-3 of the MCFs 200-3. The connector 190-2 relays optical signals between the core 202-2 of the MCF 200-2 and the core 202-3 of the MCF 200-3.

In the Add/Drop node 120-3, similarly to the connector 190-1, the connector 190-3 adds and drops optical signals to and from the cores 201-3 and 202-3 of the MCF 200-3 and the core 202-4 of the MCF 200-4. The connector 190-3 connects the dropped optical signals to the transceiving devices 125-3 that communicate with the Add/Drop nodes 120-1, 120-2, and 120-4. Moreover, the connector 190-3 adds optical signals generated by the transceiving devices 125-3 that communicate with the Add/Drop nodes 120-2, 120-1, and 120-4 to the cores 201-3 and 202-3 of the MCF 200-3 and the core 202-4 of the MCF 200-4. The connector 190-3 relays optical signals between the core 203-3 of the MCF 200-3 and the core 203-4 of the MCF 200-4.

In the Add/Drop node 120-4, similarly to the connector 190-1, the connector 190-4 adds and drops optical signals to and from the cores 202-4 and 203-4 of the MCF 200-4 and the core 201-1 of the MCF 200-1. The connector 190-4 connects the dropped optical signal to the transceiving devices 125-4 that communicate with the Add/Drop nodes 120-3, 120-2, and 120-1. Moreover, the connector 190-4 adds optical signals generated by the transceiving devices 125-4 that communicate with the Add/Drop nodes 120-3, 120-2, and 120-1 to the core 201-1 of the MCF 200-1 and the cores 201-4 and 202-4 of the MCF 200-4.

When the MCFs 200-1 to 200-4 are connected together as described above using the connectors 190-1 to 190-4, one-to-one communication paths are formed between the Add/Drop nodes 120-1 to 120-4. The communication system 100E has a perfect mesh-type logical topology.

In the communication system 100E, a configuration in which a communication path is formed between each of two nodes of the Add/Drop nodes 120-1 to 120-4 has been described. However, the communication system may have a partial mesh-type logical topology in which a communication path is formed between some of the Add/Drop nodes 120-1 to 120-4. Moreover, in the communication system 100E, a configuration of two-way communication in which optical signals of which the transmission directions are different are transmitted through one core has been described. However, the communication system may perform one-way communication in which an optical signal of one transmission direction are transmitted through one core as shown in FIG. 1, 6, 7, and the like. Moreover, the communication system may have a dual-system configuration in which two systems of communication paths are formed between the Add/Drop nodes 120-1 to 120-4.

Four communication systems 100, 100A, 100D, and 100E have been described as a communication system to which the connector according to an embodiment of the present invention can be applied. In the communication systems, a configuration in which an MCF is used for connection between nodes has been described. However, the connector described in the respective embodiments may be applied to a communication system in which a single core fiber (SCF) is used for connection between nodes. When the SCFs are used for connection between nodes, a conversion connector for connecting the MCF to a plurality of SCFs or a conversion connector for connecting a connector to a plurality of SCFs is used.

Figure 9:
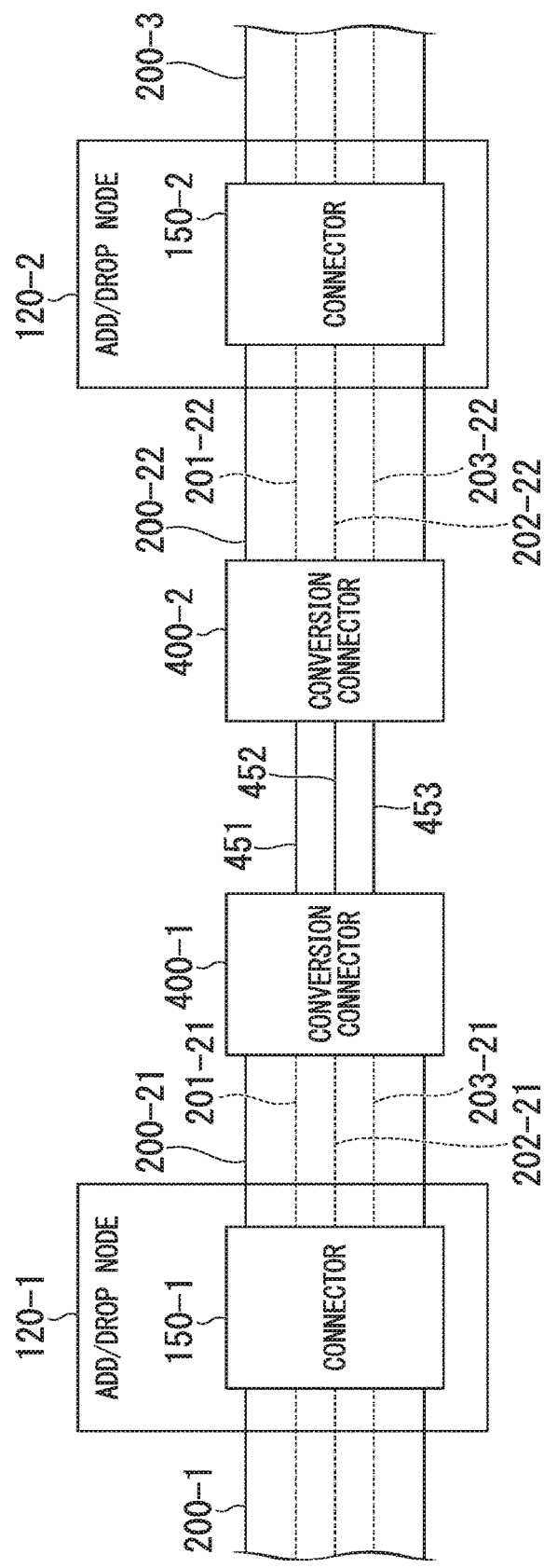
FIG. 9 is a diagram showing a first configuration example of the communication system shown in FIG. 1, in which a plurality of SCFs are used in a partial segment of the connection between Add/Drop nodes.

FIG. 9 is a block diagram showing a first configuration example of the communication system 100 shown in FIG. 1 in which a plurality of SCFs 451, 452, and 453 are used in a partial segment of the connection between the Add/Drop node 120-1 and the Add/Drop node 120-2. The SCFs 451, 452, and 453 are used between an MCF 200-21 connected to a connector 150-1 and an MCF 200-22 connected to a connector 150-2.

A conversion connector 400-1 is used for connection between the MCF 200-21 and the SCFs 451 to 453. The conversion connector 400-1 connects cores 201-21, 202-21, 203-21 of the MCF 200-21 to the SCFs 451, 452, and 453, respectively. A conversion connector 400-2 is used for the connection between the MCF 200-22 and the SCFs 451 to 453. The conversion connector 400-2 connects cores 201-22, 202-22, and 203-22 of the MCF 200-22 to the SCFs 451, 452, and 453, respectively.

The conversion connectors 400-1 and 400-2 have a configuration similar to that of a fan-in device or a fan-out device. By using the conversion connectors 400-1 and 400-2, it is possible to use the SCF in a partial segment of the connection between nodes.

Figure 10:
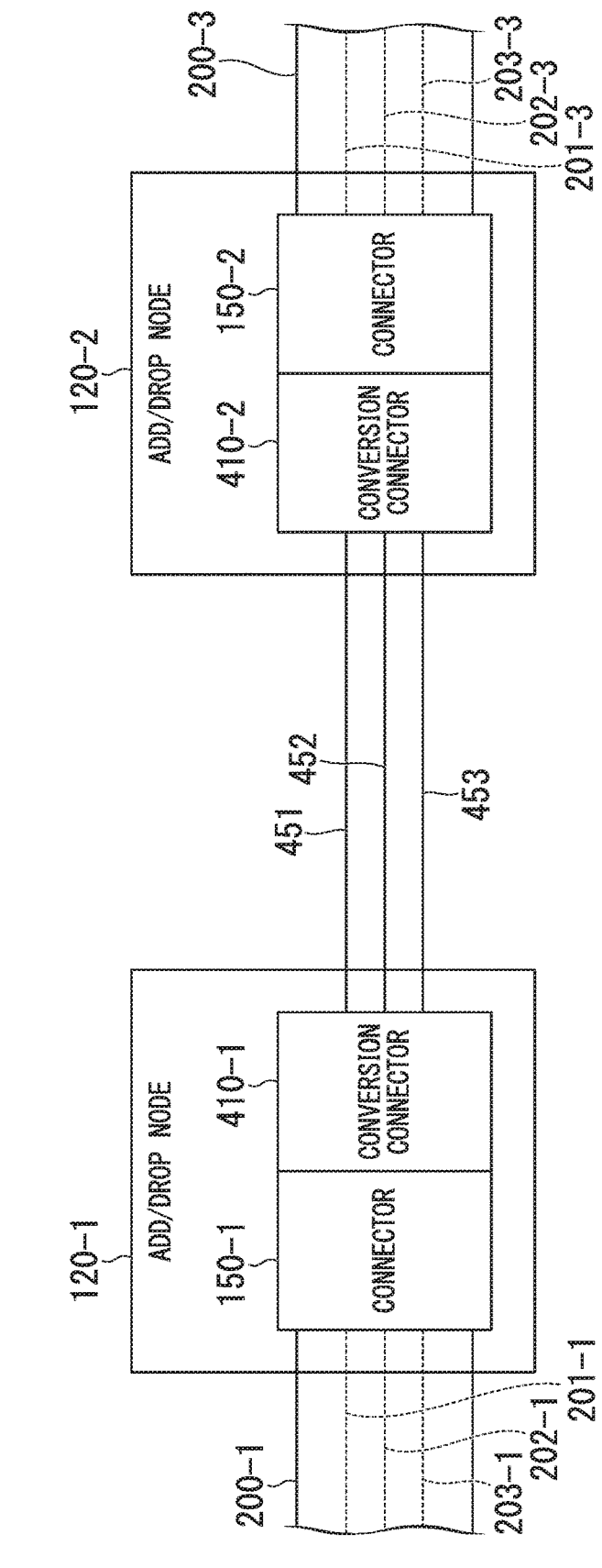
FIG. 10 is a diagram showing a second configuration example of the communication system shown in FIG. 1, in which a plurality of SCFs are used in the connection between Add/Drop nodes.

FIG. 10 is a block diagram showing a second configuration example of the communication system 100 shown in FIG. 1 in which a plurality of SCFs 451, 452, and 453 are used in the connection between the Add/Drop node 120-1 and the Add/Drop node 120-2. The SCFs 451, 452, and 453 are used for the connection between the connector 150-1 and the connector 150-2. The configuration example shown in FIG. 10 is different from the configuration example shown in FIG. 9 in that an MCF is not used for the connection between the Add/Drop nodes 120-1 and 120-2.

The Add/Drop node 120-1 further includes a conversion connector 410-1. The conversion connector 410-1 is attached to a side of the connector 150-1 close to the Add/Drop node 120-2. The Add/Drop node 120-2 further includes a conversion connector 410-2. The conversion connector 410-2 is attached to a side of the connector 150-2 close to the Add/Drop node 120-1. The SCFs 451 to 453 of the same number as the number of cores of the MCF 200 are used for the connection between the conversion connectors 410-1 and 410-2.

The conversion connector 410-1 connects the SCFs 451, 452, and 453 to the connector 150-1. The connector 150-1 performs input/output of optical signals to and from the conversion connector 410-1 instead of the MCF 200-2. The connector 150-1 connects the cores 202-1 and 203-1 of the MCF 200-1 to the SCFs 452 and 453, respectively, via the conversion connector 410-1. The conversion connector 410-1 adds an optical signal generated by the transmitting device 121-1 to the SCF 451 via the connector 150-1.

The conversion connector 410-2 connects the SCFs 451, 452, and 453 to the connector 150-2. The connector 150-2 performs input/output of optical signals to/from the conversion connector 410-2 instead of the MCF 200-2. The connector 150-2 connects the SCF 451 and 453 to the cores 201-3 and 203-3 of the MCF 200-3, respectively, via the conversion connector 410-2. The connector 150-2 connects an optical signal dropped from the SCF 453 to the receiving device 122-2 via the conversion connector 410-2.

The conversion connectors 410-1 and 410-2 has a configuration similar to that of a fan-in device or a fan-out device. By using the conversion connectors 410-1 and 410-2, it is possible to use the SCF for the connection between nodes.

FIGS. 9 and 10 show a configuration example in which nodes are connected together using the SCFs instead of the MCF 200 having three cores. SCFs may be used for the connection between nodes instead of the MCF having two cores or four or more cores. In this case, similarly, a conversion connector is used.

FIGS. 9 and 10 show an example in which SCFs are used for the connection between the Add/Drop nodes 120-1 and 120-2 of the communication system 100 shown in FIG. 1. The SCF may be used for the connection between other nodes. In this case, the conversion connector 400 may be used for the connection between one set of nodes and the conversion connector 410 may be used for the connection between the other set of nodes. Moreover, a combination of the conversion connector 400 that connects together an MCF and SCFs and the conversion connector 410 connected to the connector 150 may be used for the connection between one set of nodes. For example, the conversion connector 400 may be used in the Add/Drop node 120-1, and the conversion connector 410 may be used in the Add/Drop node 120-2.

MCF and SCF may be switched a plurality of times for the connection between one set of nodes. For example, MCF and SCF may be used for the connection between the Add/Drop nodes 120-1 and 120-2 in the order of MCF, SCF, MCF, SCF, and MCF. In this case, a conversion connector is used between the MCF and the SCF.

The connector 150-1 and the conversion connector 410-1 described in FIG. 10 may be configured as one connector. Similarly, the connector 150-2 and the conversion connector 410-2 may be configured as one connector. That is, a connector connected to the MCF and the plurality of SCFs may add or drop optical signals to or from the MCF or the SCF and may relay optical signals between the MCF and the SCF.

As described above, the SCF may be used in one or a plurality of connections between the nodes in the communication system 100 shown in FIG. 1 and the other communication systems.

First Embodiment

In a communication system according to a first embodiment of the present invention, a connector having the same configuration in each node connects together MCFs. The connector adds and drops optical signals to and from the subject node. By using a connector having the same configuration or shape in respective nodes, it is not necessary to prepare connectors having different configurations or shapes in respective nodes. Furthermore, it is possible to reduce the cost when configuring a communication system and to suppress human errors such as the use of a wrong connector when connecting MCFs.

Figure 11A:
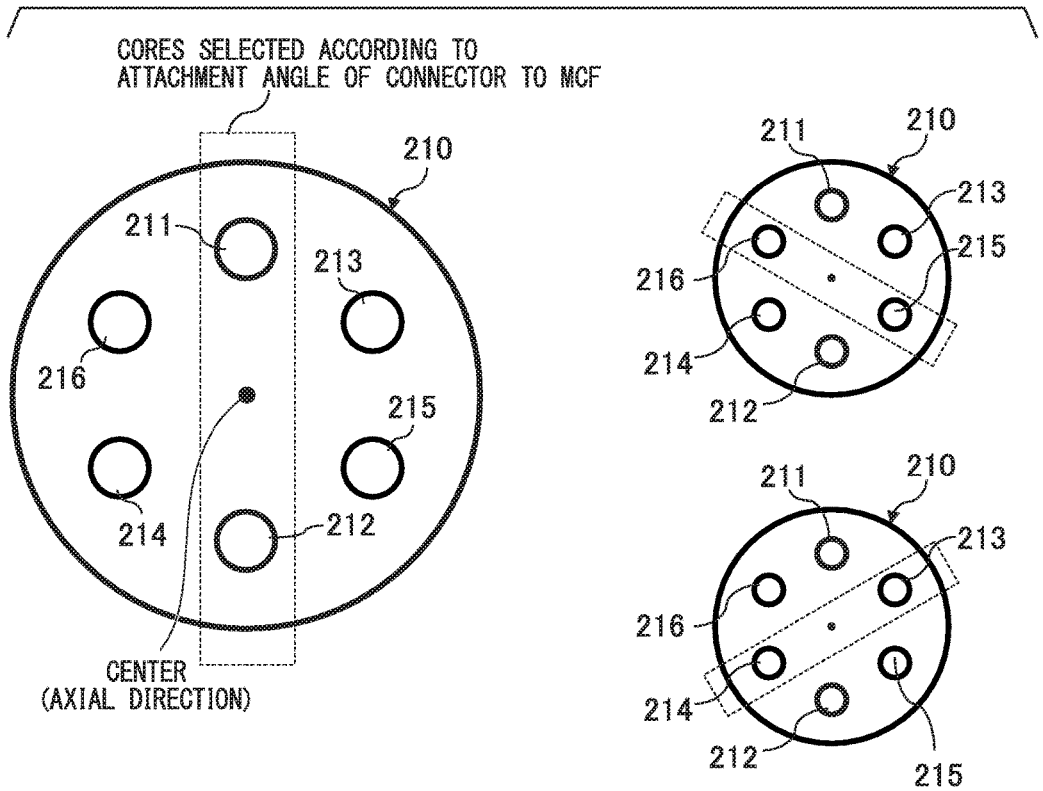
FIG. 11A is a first diagram showing a configuration of a connector according to a first embodiment of the present invention.
Figure 11B:
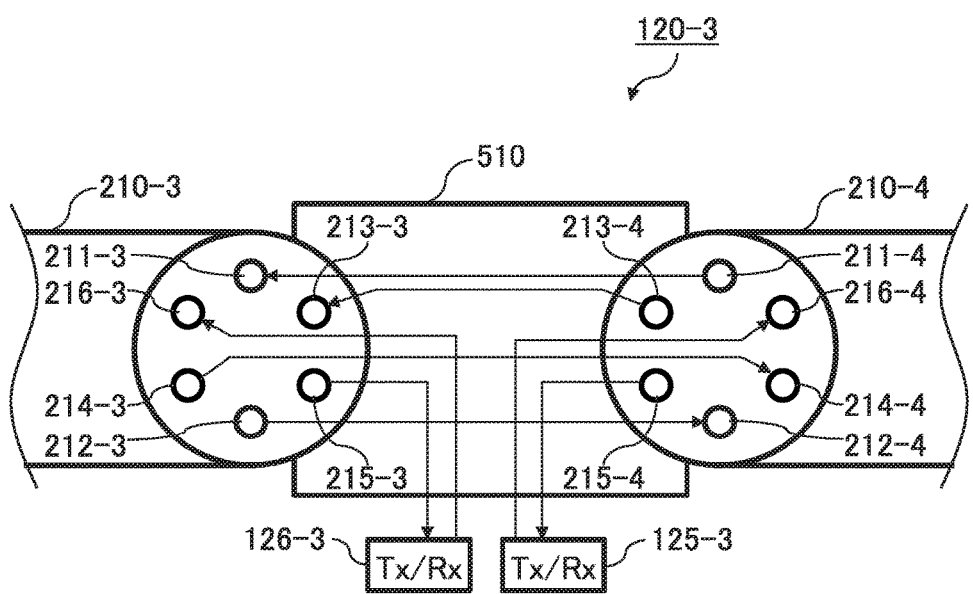
FIG. 11B is a second diagram showing a configuration of the connector according to the first embodiment.

FIGS. 11A and 11B are diagrams showing a configuration of a connector 510 according to the first embodiment. The connector 510 of the first embodiment is used in a communication system which has a ring-type physical topology and a tree-type logical topology in which two transceiving nodes are used as root nodes, similarly to the communication system 100A shown in FIG. 6, for example. The connector 510 connects together two multi-core fibers in which a plurality of cores are disposed on a circumference about a central shaft of the multi-core fiber in a cross-section of the multi-core fiber. The plurality of cores of the two multi-core fibers are arranged in the same manner. The connector 510 is used in each of the Add/Drop nodes of the communication system 100A shown in FIG. 6. A multi-core fiber (MCF) 210 shown in FIGS. 11A and 11B is the MCF 210 used in the communication system 100A shown in FIG. 6 and includes six cores 211 to 216. The six cores 211 to 216 are disposed at equal intervals on a concentric circle and are disposed in rotational symmetry of the sixth-order when seen from the axial direction of the MCF 210.

The connector 510 selects two cores among the cores 211 to 216 as shown in FIG. 11A. The connector 510 adds or drops an optical signal to or from the selected two cores and relays optical signals between the other cores. A set of cores which are the Add/Drop target of the optical signals is any one of a set of cores 211 and 212, a set of cores 213 and 214, and a set of cores 215 and 216. Due to rotational symmetry of the core arrangement, when the connector 510 is attached to a position rotated by 60 degrees in the clockwise direction around the central shaft of the MCF in the axial direction (the depth direction with respect to the sheet surface) of the MCF 210 with respect to the attachment position of the connector 510 and the MCF 210 when optical signals are added or dropped to or from the cores 211 and 212, the connector 510 can add or drop optical signals to or from the cores 213 and 214. Furthermore, when the connector 510 is attached to a position rotated by 120 degrees around the central shaft of the MCF with respect to the axial direction of the MCF 210, the connector 510 can add or drop optical signals to or from the cores 215 and 216.

The connector 510 may be attached to the MCF 210 so that a user can easily understand a rotation angle of the connector 510 around the axial direction of the MCF 210. For example, a line or a mark serving as a guide may be attached to the coating of the MCF 210 along the axial direction so that a reference position can be understood. The reference position is a position from which the position of the core 211 can be understood, for example. Moreover, the coating of the MCF 210 may be formed in such a shape that the reference position can be understood. For example, a groove or a projection may be formed on the coating along the axial direction so that the position of the core 211 can be understood.

FIG. 11B is a diagram showing handling of optical signals when two MCFs 210 are connected by the connector 510. FIG. 11B shows a case in which the connector 510 is used in the Add/Drop node 120-3 of the communication system 100A shown in FIG. 6. That is, a case in which the connector 510 is used instead of the connector 160-3 is shown. The connector 510 connects the MCF 210-3 and the MCF 210-4.

The connector 510 drops an optical signal from the core 215-3 of the MCF 210-3 and connects the dropped optical signal to the transceiving device 126-3. The connector 510 adds an optical signal addressed to the transceiving node 110a, generated by the transceiving device 126-3 to the core 216-3 of the MCF 210-3. Moreover, the connector 510 drops an optical signal from the core 215-4 of the MCF 210-4 and connects the dropped optical signal to the transceiving device 125-3. The connector 510 adds an optical signal addressed to the transceiving node 110b, generated by the transceiving device 125-3 to the core 216-4 of the MCF 210-4. Moreover, the connector 510 relays optical signals in the cores 211-214 other than the Add/Drop target cores among the cores 211 to 216 that face each other when the reference position of the MCF 210-3 and the reference position of the MCF 210-4 are aligned.

By rotating the connector 510 by a predetermined angle around the axial direction of the MCF 210 when attaching the connector 510 to the MCF 210, it is possible to allow the connector 510 to select an Add/Drop target core. When the Add/Drop target core is different for each node, the connector 510 is rotated at different angles at each node around the axial direction of the MCF 210 and is then attached to the MCF 210. When the connector 510 is attached to the MCF 210 in this manner, it is possible to add or drop an optical signal to or from a desired core using the same connector 510 in respective nodes. Here, the angle different for each node is an angle which is an integer multiple of (360/n) degrees when the arrangement of cores in the MCF 210 is rotational symmetry of the n-th order. In the present embodiment, since two cores are selected, the same cores are selected for each angle combination of 0/180 degrees, 60/240 degrees, and 120/300 degrees.

In FIGS. 11A and 11B, an example in which a set of cores facing each other with the center (the central shaft of the multi-core fiber) interposed therebetween is selected as a set of selected cores of the multi-core fiber 210 has been described. However, the set of selected cores may be other than those shown in FIGS. 11A and 11B. For example, a set of adjacent cores may be selected. A set of cores 211 and 213, a set of cores 215 and 212, and a set of cores 214 and 216 may be selected. In this case, when an attachment position of a connector that selects the set of cores 211 and 213 is used as a reference position, in a node that selects the set of cores 215 and 212, the connector is attached to the multi-core fiber at a position rotated by 120 degrees in the clockwise direction from the reference position around the central axis of the multi-core fiber. Moreover, in a node that selects the set of cores 214 and 216, the connector is attached to the multi-core fiber at a position rotated by 240 degrees in the clockwise direction from the reference position around the central axis.

In the present embodiment, an example of a core arrangement in the multi-core fiber and a configuration example of the connector corresponding to the core arrangement have been shown. Without being limited to the above-described examples, even when there are a plurality of Add/Drop nodes, it is sufficient if a core allocated to each Add/Drop node can be selected according to a rotation angle at which the connector is attached to the multi-core fiber. When there are n Add/Drop nodes, the cores may be arranged in the multi-core fiber so that Add/Drop target cores are selected at respective n different rotation angles and optical signals of other cores are relayed between multi-core fibers. In this case, the connector may have a relay structure of optical signals to be used in partial nodes only so that optical signals can be relayed between multi-core fibers.

Moreover, by connecting the MCF 210-i (i=1, 2, 3) and the MCF 200-(i+1) via the connector 510, it is possible to easily acquire an optical signal addressed to the Add/Drop node 120-i and add optical signals to the transceiving nodes 110a and 110b. Since a process of dividing multiplexed optical signals having different wavelengths in respective wavelengths is not required in adding or dropping optical signals, it is possible to reduce the time and labor required for installation and maintenance of devices in the Add/Drop node 120.

Second Embodiment

Figure 12A:
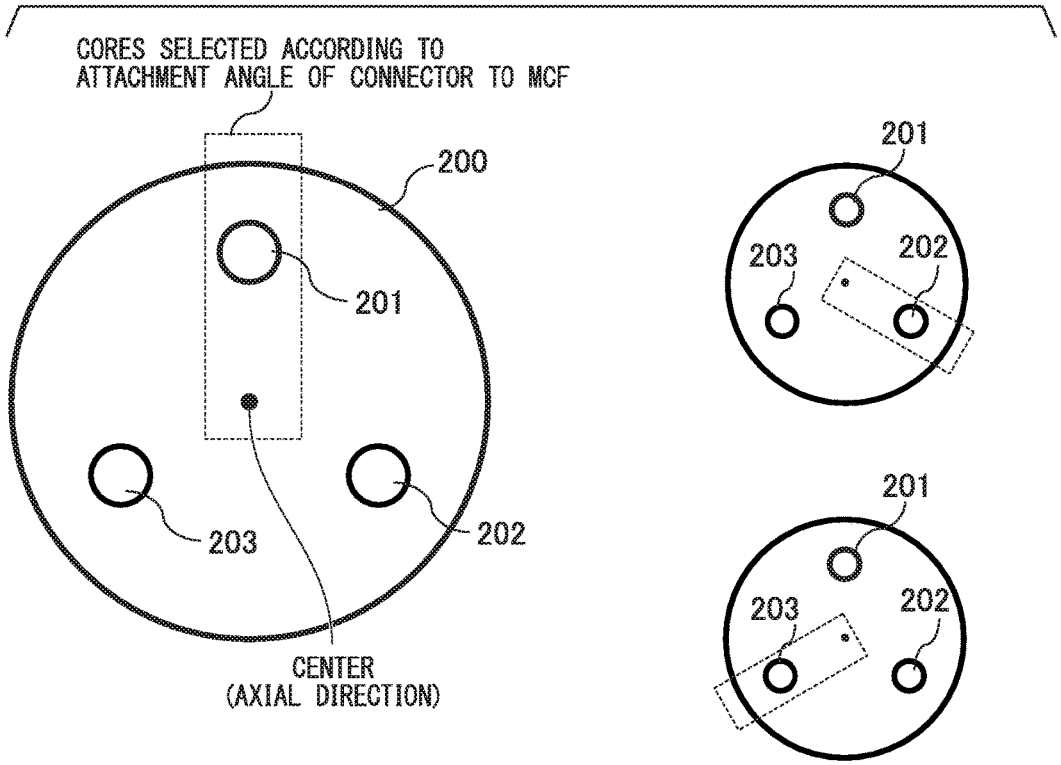
FIG. 12A is a first diagram showing a configuration of a connector according to a second embodiment of the present invention.
Figure 12B:
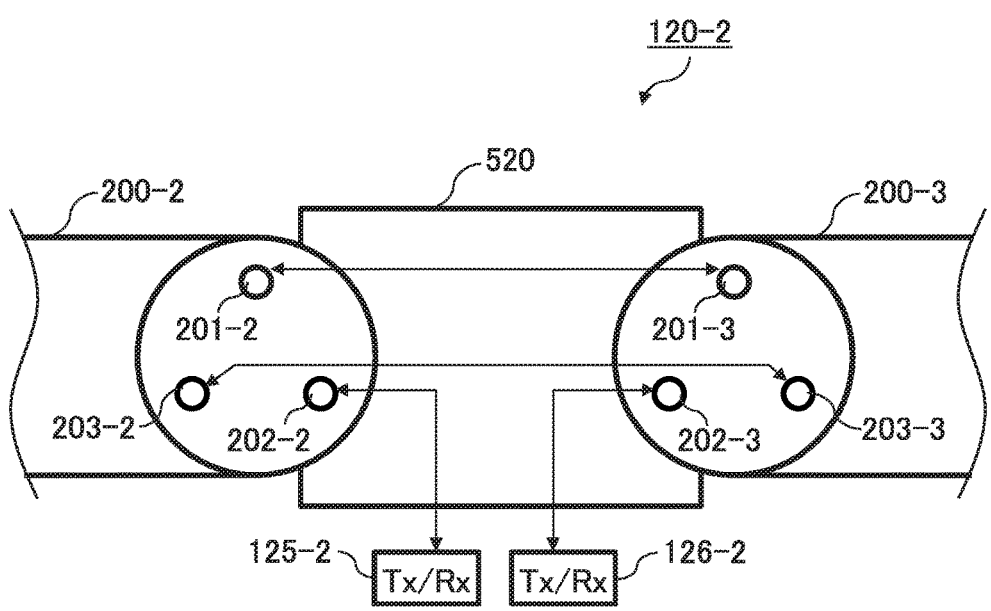
FIG. 12B is a second diagram showing a configuration of the connector of the second embodiment.

Although the connector 510 of the first embodiment adds or drops optical signals to or from two cores of the MCF at each transceiving node, a connector of the second embodiment adds or drops optical signals to or from one core of the MCF at each transceiving node. FIGS. 12A and 12B are diagrams showing a configuration of a connector 520 of the second embodiment. The connector 520 is used in a communication system which has a ring-type physical topology and a tree-type logical topology in which a transceiving node is used as a root node similarly to the communication system shown in FIG. 1 or 7, for example. The connector 520 connects two multi-core fibers in which a plurality of cores are disposed on a circumference about a central shaft of the multi-core fiber in a cross-section of the multi-core fiber. The plurality of cores of the two multi-core fibers are arranged in the same manner. The connector 520 is used in each Add/Drop node of the communication system shown in FIG. 1 or 7. A multi-core fiber (MCF) 200 shown in FIGS. 12A and 12B is the MCF 200 used in the communication system shown in FIG. 1 or 7 and includes three cores 201 to 203. The three cores 201 to 203 are disposed at equal intervals on a concentric circle and are disposed in rotational symmetry of the third-order when seen from the axial direction of the MCF 200.

As shown in FIG. 12A, the connector 520 adds or drops an optical signal to or from any one of the cores 201 to 203 and relays optical signals to the other cores. Due to rotational symmetry of the core arrangement, when the connector 510 is attached to a position rotated by 120 degrees in the clockwise direction around the central shaft of the MCF in the axial direction (the depth direction with respect to the sheet surface) of the MCF 200 with respect to the attachment position of the connector 520 and the MCF 200 when optical signals are added or dropped to or from the core 201, the connector 520 can add or drop optical signals to or from the core 202. Furthermore, when the connector 520 is attached to a position rotated by 240 degrees around the central shaft of the MCF with respect to the axial direction of the MCF 200, the connector 510 can add or drop an optical signals to or from the core 203.

Similarly to the first embodiment, the connector 520 may be attached to the MCF 200 so that a user can easily understand a rotation angle of the connector 520 around the axial direction of the MCF 200. For example, a line, a mark, a groove, or a projection serving as a guide may be attached to the coating of the MCF 200 along the axial direction so that a reference position can be understood. The reference position is a position from which the position of the core 201 can be understood, for example.

FIG. 12B is a diagram showing handling of optical signals when two MCFs 200 are connected to the connector 520. FIG. 12B shows a case in which the connector 520 is used in the Add/Drop node 120-2 of the communication system 100D shown in FIG. 7. That is, a case in which the connector 520 is used instead of the connector 185-2 is shown. The connector 520 is connected to the MCF 200-2 and the MCF 200-3.

The connector 520 drops an optical signal from the core 202-2 of the MCF 200-2 and connects the dropped optical signal to the transceiving device 125-2. The connector 520 adds an optical signal addressed to the transceiving node 110a, generated by the transceiving device 125-2 to the core 202-2 of the MCF 200-2. Moreover, the connector 520 drops an optical signal from the core 202-3 of the MCF 200-3 and connects the dropped optical signal to the transceiving device 126-2. The connector 520 adds an optical signal addressed to the transceiving node 110b, generated by the transceiving device 126-2 to the core 203-3 of the MCF 200-3. Moreover, the connector 510 relays optical signals in the cores 201 and 203 other than the Add/Drop target core among the cores 201 to 203 that face each other when the reference position of the MCF 200-2 and the reference position of the MCF 200-3 are aligned.

By rotating the connector 520 by a predetermined angle around the axial direction of the MCF 200 when attaching the connector 520 to the MCF 200, it is possible to allow the connector 520 to select an Add/Drop target core. When the Add/Drop target core is different at each node, the connector 520 is attached to the MCF 200 at different angles around the axial direction of the MCF 200 at each node. In this way, it is possible to add or drop an optical signal to or from a desired core using the same connector 520 in each node. Moreover, since a process of dividing multiplexed optical signals having different wavelengths is not required when optical signals are added or dropped in a core, it is possible to reduce the time and labor required for installation and maintenance of devices in the Add/Drop node.

In the present embodiment, an example of a core arrangement in the multi-core fiber and a configuration example of the connector corresponding to the core arrangement have been shown. Without being limited to the above-described examples, even when there are a plurality of Add/Drop nodes, it is sufficient if a core allocated to each Add/Drop node can be selected according to a rotation angle at which the connector is attached to the multi-core fiber. When there are n Add/Drop nodes, it is sufficient that the cores are arranged in the multi-core fiber so that Add/Drop target cores are selected at n different rotation angles and optical signals of other cores are relayed between multi-core fibers. In this case, the connector may have a relay structure of optical signals to be used in partial nodes only so that optical signals can be relayed between multi-core fibers.

As described above, the connectors provided in the Add/Drop nodes of the communication systems according to the first and second embodiments have the same configuration. For example, each connector has a configuration in which the connector connects together a first MCF that connects the subject node in which the connector is provided to a first node adjacent to the subject node and a second MCF that connects the subject node to a second node adjacent to the first node on the opposite side. Moreover, the connector is attached to the first and second MCFs at positions rotated by different angles around the central shaft directions of the first and second MCFs at each node with respect to the reference position. The connector is configured to add or drop an optical signal to or from a core selected according to the attachment angle to the MCF and relay optical signals between the other cores. Moreover, the connector includes a connecting portion that adds or drops an optical signal to or from a core through which communication between the subject node and other nodes is transmitted and a signal relay portion that relays a signal transmitted through a core allocated for communication between other nodes between the first and second MCFs. For example, in the connector 520 shown in FIGS. 12A and 12B, the connecting portion is configured to connect an optical signal from the core 202-2 to the transceiving device 125-2, and the signal relay portion is configured to connect together the cores 201-2 and 201-3 and relay an optical signal between both cores.

Third Embodiment

Figure 13:
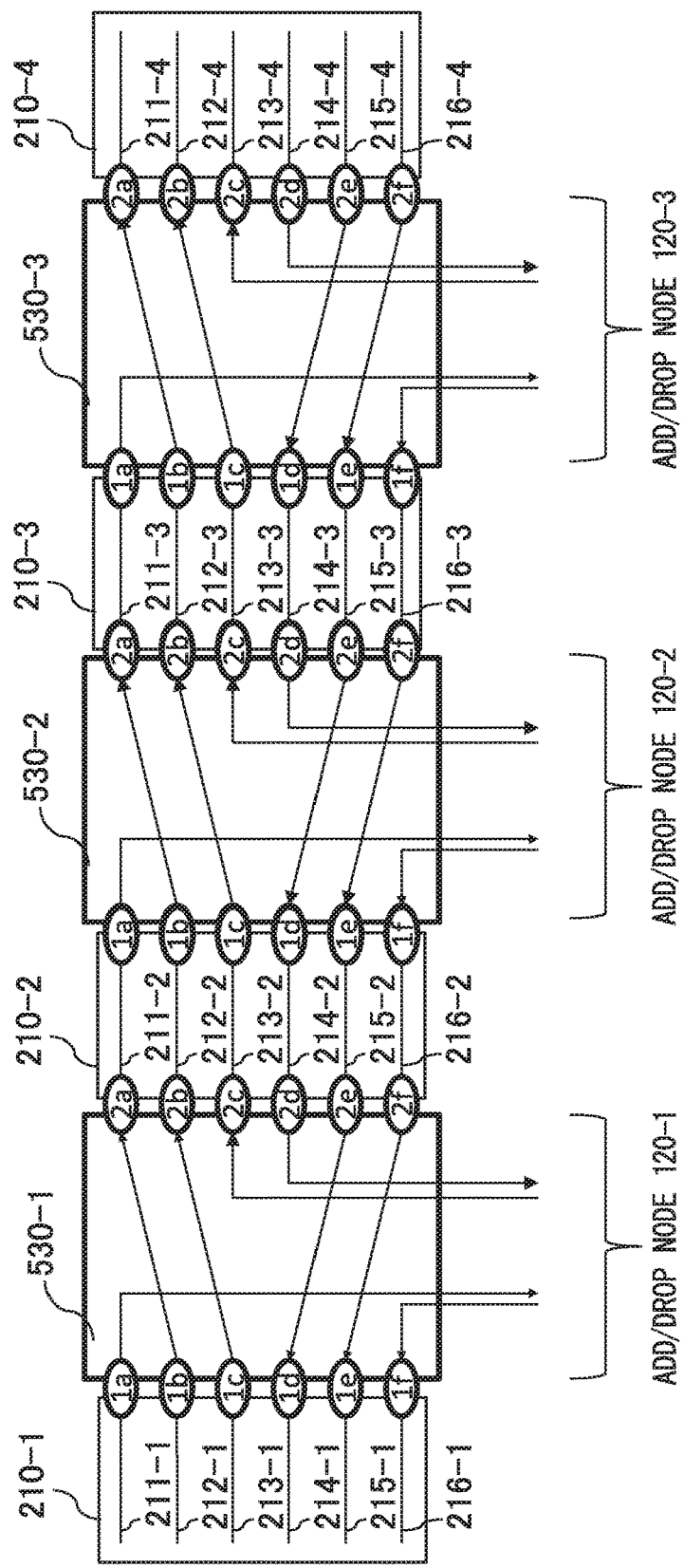
FIG. 13 is a diagram showing a configuration of a connector according to a third embodiment of the present invention.

A connector of a third embodiment is a connector which has the same configuration that can be used in reach node regardless of a core arrangement in a multi-core fiber unlike the connectors of the first and second embodiments. FIG. 13 is a diagram showing a configuration of a connector 530 according to the third embodiment. The connector 530 is used in a communication system which has a ring-type physical topology similarly to the communication system 100A shown in FIG. 6 and a tree-type logical topology in which two transceiving nodes are used as root nodes. FIG. 13 shows the connection between the connectors 530 and the MCFs 210-1 to 210-4 when the connectors 530 are used in the Add/Drop nodes 120-1 to 120-3 of the communication system 100A.

The connector 530 is characterized in a method of relaying optical signals between two MCFs 210 to which the connector 530 is connected. The connector 530 can add or drop an optical signal related to the subject node to or from the same cores at any Add/Drop nodes 120-1 to 120-3. In this example, description is provided focusing on the connector 530-2 provided in the Add/Drop node 120-2. However, all connectors 530 have the same configuration.

The MCF 210-2 is connected to a side of the connector 530-2 close to the transceiving node 110a, and the MCF 210-3 is connected to a side of the connector 530-2 close to the transceiving node 110b. The connector 530-2 has connection points connected to the cores 211-2 to 216-2 of the MCF 210-2 and the cores 211-3 to 216-3 of the MCF 210-3. At each connection point, an optical signal is input and output to and from cores connected thereto. The connector 530-2 has connection points 1a to 1f for the respective cores of the MCF 210-2 and connection points 2a to 2f for the respective cores of the MCF 210-3.

In the connector 530-2, the connection point 1a is connected to the core 211-2 of the MCF 210-2 and drops an optical signal addressed from the transceiving node 110a to the subject node from the core 211-2. The optical signal dropped by the connection point 1a is connected to the transceiving device 125-2 provided in the Add/Drop node 120-2 through the connector 530-2. The connection point 1b is connected to the core 212-2 of the MCF 210-2 and drops an optical signal addressed from the transceiving node 110a to the Add/Drop node 120-3 from the core 212-2. The optical signal dropped by the connection point 1b is relayed by being connected to the connection point 2a. The connection point 1c is connected to the core 213-2 of the MCF 210-2 and drops an optical signal addressed from the Add/Drop node 120-1 to the transceiving node 110b from the core 213-2. The optical signal dropped by the connection point 1c is relayed by being connected to the connection point 2b.

The connection point 1d is connected to the core 214-2 of the MCF 210-2. The optical signal which is dropped by the connection point 2e and is addressed from the transceiving node 110b to the Add/Drop node 120-1 is relayed to the core 214-2 by being connected to the connection point 1d. The connection point 1e is connected to the core 215-2 of the MCF 210-2. The optical signal which is dropped by the connection point 2f and is addressed from the Add/Drop node 120-3 to the transceiving node 110a is relayed to the core 215-2 by being connected to the connection point 1e. The connection point 1f is connected to the core 216-2 of the MCF 210-2 and adds an optical signal which is generated by the transceiving device 125-2 and is addressed from the subject node to the transceiving node 110a to the core 216-2.

The connection point 2a is connected to the core 211-3 of the MCF 210-3. The optical signal dropped by the connection point 1b is relayed to the core 211-3 by being connected to the connection point 2a. The connection point 2b is connected to the core 212-3 of the MCF 210-3. The optical signal dropped by the connection point 1c is relayed to the core 211-3 by being connected to the connection point 2b. The connection point 2c is connected to the core 212-3 of the MCF 210-3 and adds the optical signal, which is generated by the transceiving device 126-2 provided in the subject node and is addressed from the subject node to the transceiving node 110b, to the core 213-3.

The connection point 2d is connected to the core 214-3 of the MCF 210-3 and drops an optical signal addressed from the transceiving node 110b to the subject node from the core 214-3. The optical signal dropped by the connection point 2d is connected to the transceiving device 126-2 through the connector 530-2. The connection point 2e is connected to the core 215-3 of the MCF 210-3 and drops an optical signal from the core 215-3. The optical signal dropped by the connection point 2e is relayed to the core 214-1 by being connected to the connection point 1d. The connection point 2f is connected to the core 216-3 of the MCF 210-3 and drops an optical signal from the core 216-3. The optical signal dropped by the connection point 2f is relayed to the core 215-2 by being connected to the connection point 1e.

In the MCFs 210-2 and 210-3 connected to the connector 530-2 having the above-described configuration, the core 211 transmits an optical signal to a node connected to a first direction side directed from the transceiving node 110a to the transceiving node 110b. The core 212 transmits an optical signal addressed to a node located two nodes ahead in the first direction. Like the core 212-4 in FIG. 13, when a node located two nodes ahead in the first direction is not present, the core 212 transmits an optical signal addressed to a node connected on the first direction side.

The core 213 transmits an optical signal addressed to a node located three nodes ahead in the first direction. Like the cores 213-3 and 213-4 in FIG. 13, when a node located three nodes ahead in the first direction is not present, the core 213 transmits an optical signal addressed to nodes located one or two nodes ahead. The core 214 transmits an optical signal addressed to a node connected to a second direction side directed from the transceiving node 110b to the transceiving node 110a.

The core 215 transmits an optical signal addressed to a node located two nodes ahead in the second direction. Like the core 215-1 in FIG. 13, when a node located two nodes ahead in the second direction is not present, the core 215 transmits an optical signal addressed to a node connected to the second direction side. The core 216 transmits an optical signal addressed to a node located three nodes ahead in the second direction. Like the cores 216-1 and 216-2 in FIG. 13, when a node located three nodes ahead in the second direction is not present, the core 216 transmits an optical signal addressed to nodes located one or two nodes ahead.

When the connector 530 having the above-described configuration is provided in each of the Add/Drop nodes 120, each Add/Drop node 120 can add or drop an optical signal for the subject node and can form communication paths between the transceiving nodes 110a and 110b and each of the Add/Drop nodes 120. In each Add/Drop node 120, the MCF 210 on the side close to the transceiving node 110a and the MCF 210 on the side close to the transceiving node 110b are connected together by the connectors 530 having the same configuration. By connecting together the MCFs 210 using the connector 530, it is not necessary to prepare connectors having different configurations for each Add/Drop node 120 and to reduce the cost for the connector. Moreover, since the same connector is used in each of the Add/Drop nodes 120, it is possible to suppress human errors such as the use of a wrong connector when connecting together MCFs. Moreover, since a process of dividing multiplexed optical signals having different wavelengths is not required when optical signals are added or dropped in a core, it is possible to reduce the time and labor required for installation and maintenance of devices in the Add/Drop node.

Fourth Embodiment

Figure 14:
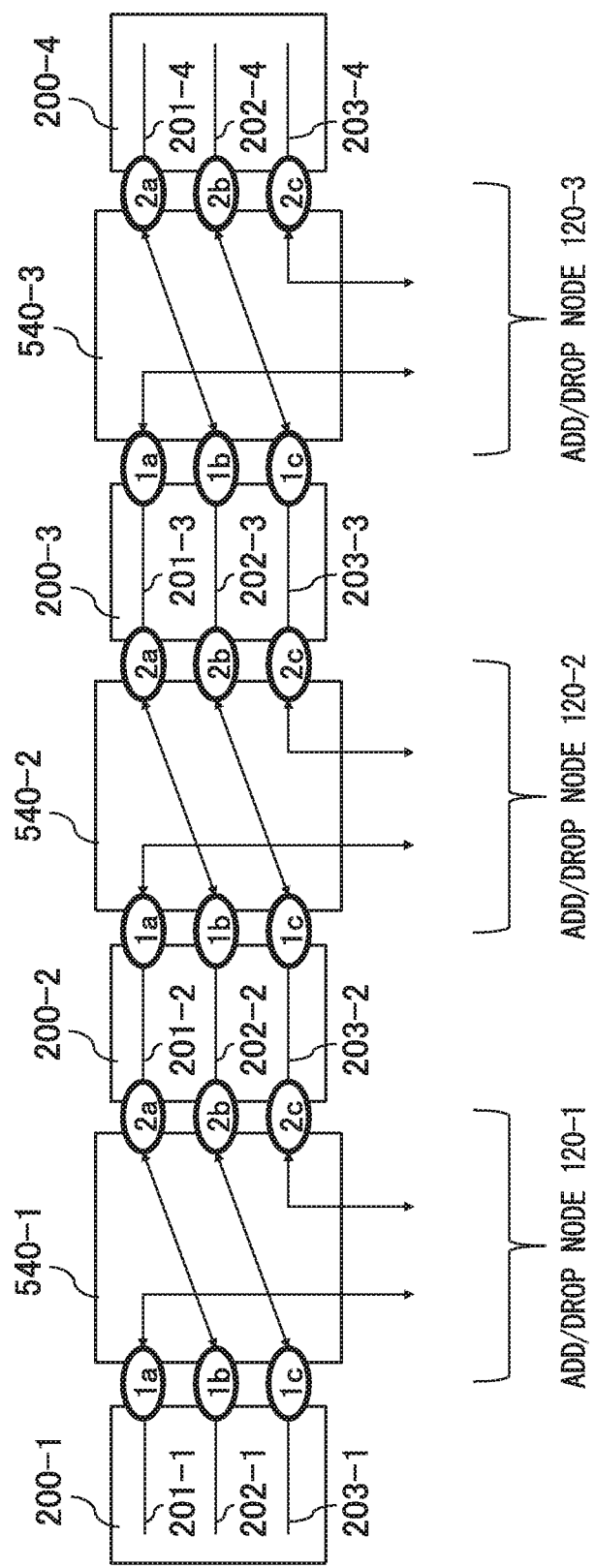
FIG. 14 is a diagram showing a configuration of a connector according to a fourth embodiment of the present invention.

A connector of a fourth embodiment is a connector which has the same configuration that can be used in each node regardless of a core arrangement in a multi-core fiber similarly to the connector of the third embodiment. FIG. 14 is a diagram showing a configuration of a connector 540 according to the fourth embodiment. The connector 540 is used in a communication system which has a ring-type physical topology similarly to the communication system 100D shown in FIG. 7 and a tree-type logical topology in which two transceiving nodes are used as root nodes. Although an optical signal of one direction only is transmitted through one core in the multi-core fiber in the third embodiment, two optical signals of which the transmission directions are different are transmitted through one core in the present embodiment. FIG. 14 shows the connection between the connectors 540 and the MCFs 200-1 to 200-4 when the connectors 540 are used in the Add/Drop nodes 120-1 to 120-3 of the communication system 100D.

The connector 540 is characterized in a method of relaying optical signals from a core to a core between two MCFs 200 to which the connector 540 is connected. The connector 540 can add or drop an optical signal related to the subject node to or from the same cores at any Add/Drop nodes 120-1 to 120-3. In this example, a description is provided focusing on the connector 540-2 provided in the Add/Drop node 120-2. However, all connectors 540 have the same configuration.

The MCF 200-2 is connected to a side of the connector 540-2 close to the transceiving node 110a, and the MCF 200-3 is connected to a side of the connector 540-2 close to the transceiving node 110b. The connector 540-2 has connection points connected to the respective cores 201 to 206 of the MCF 200-2 and the respective cores 201 to 206 of the MCF 200-3. At each connection point, an optical signal is input and output to or from cores connected thereto. The connector 540-2 has connection points 1a to 1c for the respective cores of the MCF 200-2 and connection points 2a to 2c for the respective cores of the MCF 200-3.

In the connector 540-2, the connection point 1a is connected to the core 201-2 of the MCF 200-2 and drops an optical signal addressed from the transceiving node 110a to the subject node to the core 201-2. The optical signal dropped by the connection point 1a is connected to the transceiving device 125-2 provided in the Add/Drop node 120-2 through the connector 540-2. Moreover, the connection point 1a adds an optical signal which is generated by the transceiving device 125-2 and is addressed from the subject node to the transceiving node 110a to the core 201-2.

The connection point 1b is connected to the core 202-2 of the MCF 200-2 and drops an optical signal addressed from the transceiving node 110a to the Add/Drop node 120-3 from the core 202-2. The optical signal dropped by the connection point 1b is relayed by being connected to the connection point 2a. Moreover, the connection point 1b connects an optical signal which is dropped by the connection point 2a and is addressed from the Add/Drop node 120-3 to the transceiving node 110a to the core 202-2.

The connection point 1c is connected to the core 203-2 of the MCF 200-2 and drops an optical signal addressed from the Add/Drop node 120-1 to the transceiving node 110b from the core 203-2. The optical signal dropped by the connection point 1c is relayed by being connected to the connection point 2b. Moreover, the connection point 1c connects an optical signal which is dropped by the connection point 2b and is addressed from the transceiving node 110b to the Add/Drop node 120-1 to the core 203-2.

The connection point 2a is connected to the core 201-3 of the MCF 200-3 and drops an optical signal from the core 201-3. The optical signal dropped by the connection point 2a is relayed by being connected to the connection point 1b. Moreover, the connection point 2a connects the optical signal dropped by the connection point 1b to the core 201-3. The connection point 2b is connected to the core 202-3 of the MCF 200-3 and drops an optical signal from the core 202-3. The optical signal dropped by the connection point 2b is relayed by being connected to the connection point 1c. Moreover, the connection point 2b connects the optical signal dropped by the connection point 1c to the core 202-3.

The connection point 2c is connected to the core 203-3 of the MCF 200-3 and drops an optical signal addressed to the subject node from the transceiving node 110b. The optical signal dropped by the connection point 2c is connected to the transceiving device 126-2 provided in the Add/Drop node 120-2 through the connector 540-2. Moreover, the connection point 2c adds an optical signal which is generated by the transceiving device 126-2 and is addressed from the subject node to the transceiving node 110b to the core 203-3.

In the MCFs 200-2 and 200-3 connected to the connector 540-2 having the above-described configuration, the core 201 transmits optical signals in communication between a node connected to the first direction side directed from the transceiving node 110a to the transceiving node 110b and a node located three nodes ahead in the second direction directed from the transceiving node 110b to the transceiving node 110a. Like the cores 201-1 and 201-2 in FIG. 14, when a node located three nodes ahead in the second direction is not present, the core 201 transmits an optical signal for communication between nodes located one or two nodes ahead and a node connected to the first direction side.

The core 202 transmits an optical signal for communication between a node located two nodes ahead in the first direction and a node located two nodes ahead in the second direction. Like the core 202-4 in FIG. 14, when a node located two nodes ahead in the first direction is not present, the core 202 transmits an optical signal for communication between a node connected to the first direction side and a node located two nodes ahead in the second direction. Moreover, like the core 202-1 in FIG. 14, when a node located two nodes ahead in the second direction is not present, the core 202 transmits an optical signal for communication between a node connected to the second direction side and a node located two nodes ahead in the first direction.

The core 203 transmits an optical signal for communication between a node located three nodes ahead in the first direction and a node connected to the second direction side. Like the cores 203-3 and 203-4 in FIG. 14, when a node located three nodes ahead in the first direction is not present, the core 203 transmits an optical signal for communication between nodes located one or two nodes ahead and a node connected to the second direction side.

When the connector 540 having the above-described configuration is provided in each Add/Drop node 120, each Add/Drop node 120 can add or drop an optical signal for the subject node and can form communication paths between the transceiving nodes 110a and 110b and the Add/Drop node 120. In each Add/Drop node 120, the MCF 200 close to the side of the transceiving node 110a and the MCF 200 on the side close to the transceiving node 110b are connected together by the connectors 540 having the same configuration. By connecting together the MCFs 200 using the connector 540, it is possible to reduce the cost of the connector and to suppress human errors such as the use of a wrong connector when connecting MCFs. Moreover, since a process of dividing multiplexed optical signals having different wavelengths is not required when optical signals are added or dropped in respective cores, it is possible to reduce the time and labor required for installation and maintenance of devices in the Add/Drop node.

The connectors provided in the Add/Drop nodes of the communication systems of the third and fourth embodiments have the same configuration. For example, each connector has a configuration in which the connector connects a first MCF that connects the subject node in which the connector is provided to a first node adjacent to the subject node to a second MCF that connects the subject node to a second node adjacent to the first node on the opposite side. Moreover, the connector has a first connection point that adds or drops an optical signal for communication between a transceiving node and the subject node to or from a first core of a first MCF, a second connection point that adds or drops an optical signal for communication between the transceiving node and a second node to or from a second core of the first MCF, and a third connection point that adds or drops an optical signal added or dropped by the second connection point to or from a first core of a second MCF. Here, the first core of the second MCF is the first core of the first MCF when seen from the second node. Moreover, the connector includes a connecting portion that adds or drops an optical signal to or from a core through which communication between the subject node and other nodes is transmitted and a signal relay portion that relays signals transmitted through a core allocated for communication between other nodes between the first and second MCFs. For example, in the connector 540-1 shown in FIG. 14, the connecting portion is configured to include the connection point 1*a* that connects an optical signal from the core 201-1 to the transceiving device, and the signal relay portion is configured to include the connection points 1*b* and 2*a* that connect together the cores 202-1 and 201-2 to relay an optical signal between both cores.

Fifth Embodiment

Figure 15A:
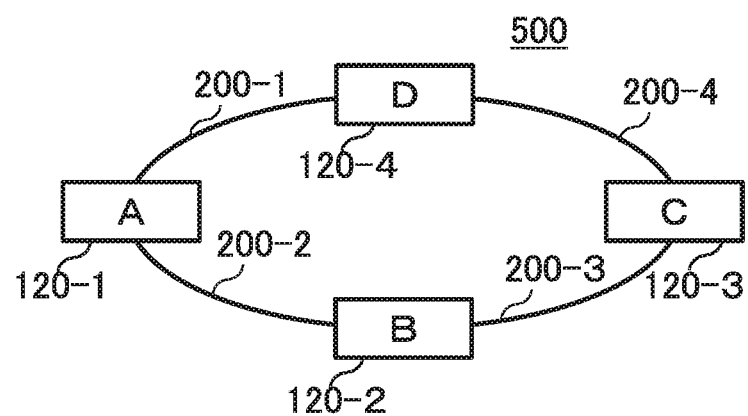
FIG. 15A is a diagram showing a physical topology of a communication system according to a fifth embodiment of the present invention.
Figure 15B:
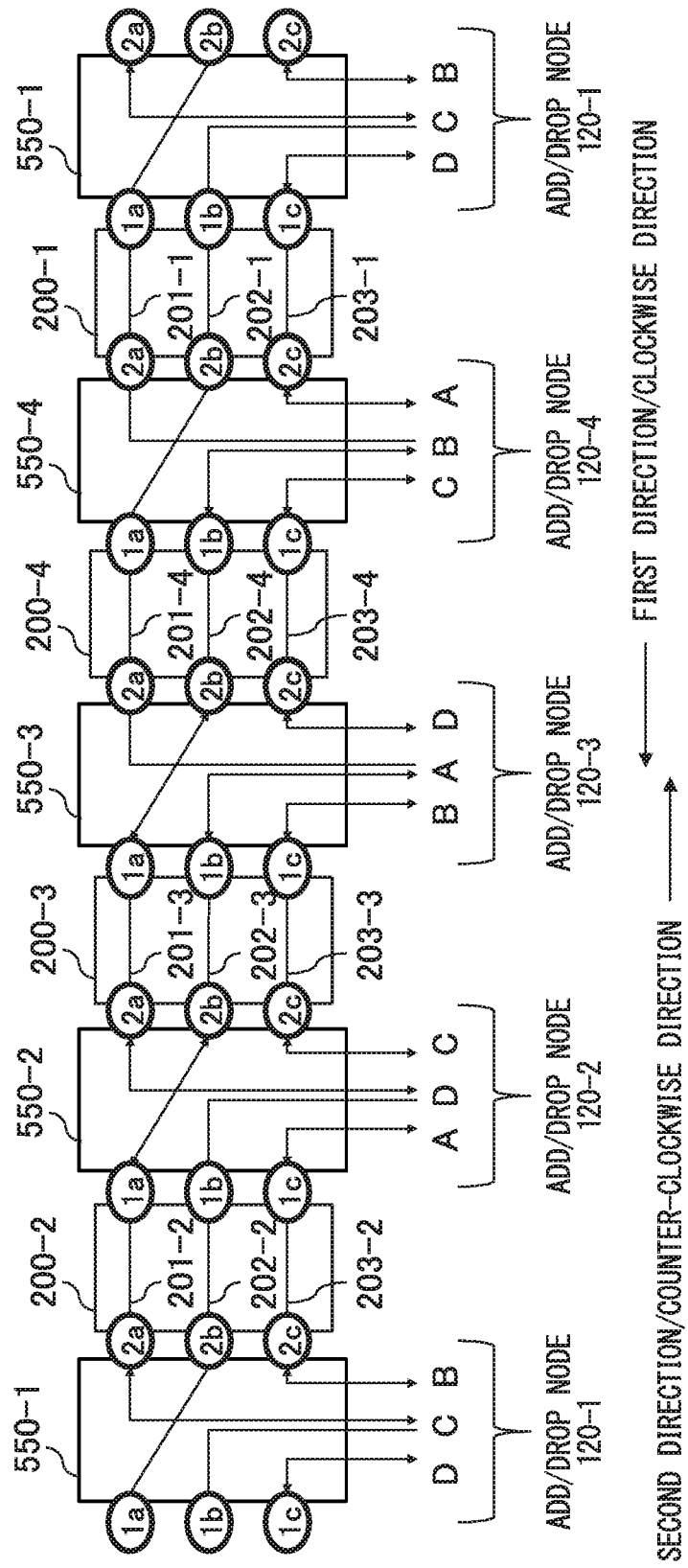
FIG. 15B is a diagram showing the connection between MCFs and connectors of Add/Drop nodes according to the fifth embodiment.

FIGS. 15A and 15B are diagrams showing a configuration of a communication system 500 and a connector 550 according to a fifth embodiment. FIG. 15A shows a physical topology of the communication system 500 of the fifth embodiment. The communication system includes four Add/Drop nodes 120-1 to 120-4 and has a ring-type physical topology in which the Add/Drop nodes 120 are connected by the MCF 200. The physical topology of the communication system 500 is the same physical topology as the communication system 100E shown in FIG. 8. Moreover, the logical topology of the communication system 500 is the same physical topology as the communication system 100E and is a perfect mesh-type logical topology in which a communication path is formed between the Add/Drop nodes 120. The MCF 200 that connects the Add/Drop nodes 120 includes three cores 201 to 203. The cores 201 to 203 transmit optical signals of which the transmission directions are different through the same core similarly to the cores 201 to 203 of the fourth embodiment.

FIG. 15B shows the connection between the respective connectors 550 and the MCFs 200-1 to 200-4 when the connector 550 is used in the respective Add/Drop nodes 120-1 to 120-4 of the communication system 500. The connector 550 is characterized in a method of relaying an optical signal from a core to a core between two MCFs 200 to which the connector is connected similarly to the connectors of the third and fourth embodiments. The connector 550 can add or drop optical signals related to the subject node to or from the same cores at any Add/Drop nodes 120-1 to 120-4. In this example, description is provided focusing on the connector 550-3 provided in the Add/Drop node 120-3. However, all connectors 550 have the same configuration.

In the Add/Drop node 120-3, the Add/Drop node 120-2 is connected to a first direction side which is a clockwise direction of a ring shape that connects together the nodes of the communication system 500 via the MCF 200-3. The Add/Drop node 120-4 is connected to a second direction side which is a counter-clockwise direction via the MCF 200-4. The connector 550-3 is connected to the MCF 200-3 on the first direction side and the MCF 200-4 on the second direction side. The connector 550-3 has connection points connected to the respective cores 201-3 to 203-3 of the MCF 200-3 and the respective cores 201-4 to 203-4 of the MCF 200-4. At each connection point, an optical signal is input and output to or from cores connected thereto. The connector 550-3 has connection points 1*a* to 1*c* for the respective cores of the MCF 200-3 and connection points 2*a* to 2*c* for the respective cores of the MCF 200-4.

In the connector 550-3, the connection point 1*a* is connected to the core 201-3 of the MCF 200-3. The connection point 1*a* drops an optical signal addressed from the Add/Drop node 120-2 connected to the first direction side of the subject node to the Add/Drop node 120-4 connected to the second direction side of the subject node from the core 201-3. The optical signal dropped by the connection point 1*a* is relayed to the core 201-4 by being connected to the connection point 2*b*. Moreover, the connection point 1*a* connects an optical signal which is dropped by the connection point 2*b* and is addressed from the Add/Drop node 120-4 to the Add/Drop node 120-2 to the core 201-3.

The connection point 1*b* is connected to the core 202-3 of the MCF 200-3. The connection point 1*b* drops an optical signal addressed from the Add/Drop node 120-1 located two nodes ahead in the first direction from the subject node to the subject node from the core 202-3. The optical signal dropped by the connection point 1*b* is connected to the transceiving device provided in the Add/Drop node 120-3. Moreover, the connection point 1*b* adds an optical signal which is generated by the transceiving device and is addressed from the subject node to the Add/Drop node 120-1 to the core 202-3.

The connection point 1*c* is connected to the core 203-3 of the MCF 200-3. The connection point 1*c* drops an optical signal addressed to the subject node from the Add/Drop node 120-2 connected to the first direction side of the subject node. The optical signal dropped by the connection point 1*c* is connected to the transceiving device of the subject node. Moreover, the connection point 1*c* adds an optical signal which is generated by the transceiving device and is addressed from the subject node to the Add/Drop node 120-2 to the core 203-3.

The connection point 2*a* is connected to the core 201-4 of the MCF 200-4. The connection point 2*a* adds an optical signal which is generated by the transceiving device of the subject node and is addressed from the subject node to the Add/Drop node 120-1 located two nodes ahead in the second direction to the core 201-4. Moreover, the connection point 2*a* drops an optical signal addressed from the Add/Drop node 120-1 to the subject node from the core 201-4. The optical signal dropped by the connection point 2*a* is connected to the transceiving device of the subject node.

The connection point 2*b* is connected to the core 202-4 of the MCF 200-4. The optical signal dropped by the connection point 1*a* is relayed to the core 202-4 by being connected to the connection point 2*b*. Moreover, the connection point 2*b* drops an optical signal addressed from the Add/Drop node 120-4 connected to the second direction side of the subject node to the Add/Drop node 120-2 connected to the first direction side of the subject node from the core 202-4. The optical signal dropped by the connection point 2*b* is relayed to the core 201-3 by being connected to the connection point 1*a*.

The connection point 2*c* is connected to the core 203-4 of the MCF 200-4. The connection point 2*c* adds an optical signal which is generated by the transceiving device of the subject node and is addressed to the Add/Drop node 120-4 connected to the second direction side of the subject node to the core 203-4. Moreover, the connection point 2*c* drops an optical signal addressed from the Add/Drop node 120-4 to the subject node from the core 203-4. The optical signal dropped by the connection point 2*c* is connected to the transceiving device of the subject node.

In the MCFs 200-3 and 200-4 connected to the connector 550-3 having the above-described configuration, the core 201 transmits an optical signal for communication between a node connected to the first direction side and a node located two nodes ahead in the second direction. The core 202 transmits an optical signal for communication between a node located two nodes ahead in the first direction and a node connected to the second direction side. The core 203 transmits an optical signal for communication between a node connected to the first direction side and a node connected to the second direction side. The connectors 550 used in all nodes have the same structure, and an optical signal is added, dropped, and relayed at each node. In FIG. 15B, paths depicted by lines without an arrow in the respective connectors 550 indicate paths which are not used in communication in the present embodiment. For example, in the connector 550-3, a path connected to the connection point 2a is a path that is not used in communication. This is because, since the connectors 550 have the same structure, a number of communication paths larger than the number of necessary communication paths are formed as a communication path. A path which is not used may be used as a communication path.

When the connector 550 having the above-described configuration is provided in each Add/Drop node 120, each Add/Drop node 120 can add or drop an optical signal for communication between the subject node and the other Add/Drop nodes 120 and can form a communication path directed to the other Add/Drop nodes 120. In each Add/Drop node 120, the MCF 200 connected to the first direction side and the MCF 200 connected to the second direction side are connected together by the connectors 550 having the same configuration. By connecting together the MCFs 200 using the connector 550, it is possible to reduce the cost of the connector and to suppress human errors such as the use of a wrong connector when connecting together MCFs. Moreover, since a process of dividing multiplexed optical signals having different wavelengths is not required when optical signals are added or dropped in a core, it is possible to reduce the time and labor required for installation and maintenance of devices in the Add/Drop node.

Sixth Embodiment

Figure 16:
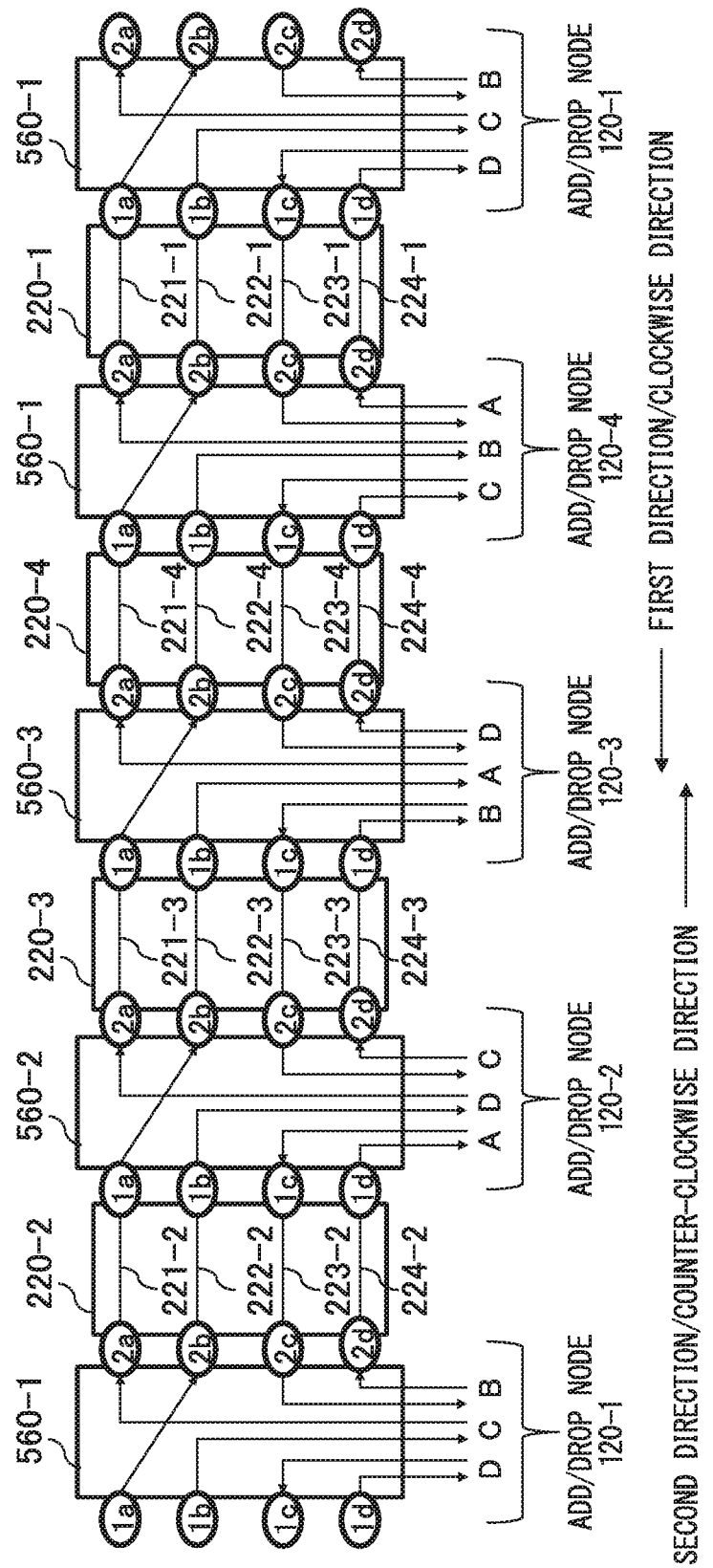
FIG. 16 is a diagram showing the connection between MCFs and connectors of Add/Drop nodes according to a sixth embodiment of the present invention.

In the fifth embodiment, a connector used in a communication system that performs two-way communication in which signals of which the transmission directions are different are transmitted using one core has been described. In a sixth embodiment, a connector used in a communication system in which optical signals are transmitted in one direction using one core will be described. FIG. 16 is a diagram showing the connection between the MCFs 220 and the connectors 560 of each of the Add/Drop nodes 120 of the sixth embodiment. The communication system of the sixth embodiment includes four Add/Drop nodes 120-1 to 120-4 similarly to the communication system of the fifth embodiment. The communication system of the sixth embodiment has a ring-type physical topology and a perfect mesh-type logical topology. The MCF 220 that connects together the Add/Drop nodes 120 includes four cores 221 to 224. The connector 560 is included in each of the Add/Drop nodes 120-1 to 120-4. In this example, a description is provided focusing on the connector 560-3 provided in the Add/Drop node 120-3. However, all connectors 560 have the same configuration.

In the Add/Drop node 120-3, the Add/Drop node 120-2 is connected to the first direction side which is a clockwise direction of a ring shape that connects together the nodes of the communication system via the MCF 220-3. The Add/Drop node 120-4 is connected to a second direction side which is a counter-clockwise direction via the MCF 220-4. The connector 560-3 is connected to the MCF 220-3 on the first direction side and the MCF 220-4 on the second direction side. The connector 560-3 has connection points connected to the respective cores 221-3 to 224-3 of the MCF 220-3 and the respective cores 221-4 to 224-4 of the MCF 220-4. At each connection point, an optical signal is input and output to or from cores connected thereto. The connector 560-3 has connection points 1a to 1d for the respective cores of the MCF 220-3 and connection points 2a to 2d for the respective cores of the MCF 220-4.

In the connector 560-3, the connection point 1a is connected to the core 221-3 of the MCF 220-3. The connection point 1a drops an optical signal addressed from the Add/Drop node 120-2 connected to the first direction side of the subject node to the Add/Drop node 120-4 connected to the second direction side from the core 221-3. The optical signal dropped by the connection point 1a is relayed by being connected to the connection point 2b. The connection point 1b is connected to the core 222-3 of the MCF 220-3. The connection point 1b drops an optical signal addressed to the subject node from the Add/Drop node 120-1 located two nodes ahead in the first direction from the subject node. The optical signal dropped by the connection point 1b is connected to the transceiving device of the subject node.

The connection point 1c is connected to the core 223-3 of the MCF 220-3. The connection point 1c adds an optical signal which is generated by the transceiving device of the subject node and is addressed from the subject node to the Add/Drop node 120-2 connected to the first direction side to the core 223-3. The connection point 1d is connected to the core 224-3 of the MCF 220-3. The connection point 1d drops an optical signal addressed to the subject node from the Add/Drop node 120-2 connected to the first direction side of the subject node. The optical signal dropped by the connection point 1d is connected to the transceiving device of the subject node.

The connection point 2a is connected to the core 221-4 of the MCF 220-4. The connection point 2a adds an optical signal which is generated by the transceiving device of the subject node and is addressed from the subject node to the Add/Drop node 120-1 located two nodes ahead in the second direction to the core 221-4. The connection point 2b is connected to the core 222-4 of the MCF 220-4. The connection point 2b connects the optical signal dropped by the connection point 1a to the core 222-4.

The connection point 2c is connected to the core 223-4 of the MCF 220-4. The connection point 2c drops an optical signal addressed to the subject node from the Add/Drop node 120-4 connected to the second direction side. The optical signal dropped by the connection point 2c is connected to the transceiving device of the subject node. The connection point 2d is connected to the core 224-4 of the MCF 220-4. The connection point 2d adds an optical signal which is generated by the transceiving device of the subject node and is addressed to the Add/Drop node 120-4 connected to the second direction side to the core 224-4.

In the MCFs 220-3 and 220-4 connected to the connector 560-3 having the above-described configuration, the core 221 transmits an optical signal from a node connected to the first direction side to a node located two nodes ahead in the second direction. The core 222 transmits an optical signal from a node located two nodes ahead in the first direction to a node connected to the second direction side. The core 223 transmits an optical signal from a node connected to the second direction side to a node connected to the first direction side. The core 224 transmits an optical signal from a node connected to the first direction side to a node connected to the second direction side.

When the connector 560 having the above-described configuration is provided in each Add/Drop node 120, each Add/Drop node 120 can add or drop an optical signal for communication between the subject node and the other Add/Drop nodes 120 and can form a communication path directed to the other Add/Drop nodes 120. In each Add/Drop node 120, the MCF 220 connected to the first direction side and the MCF 220 connected to the second direction side are connected together by the connectors 560 having the same configuration. By connecting together the MCFs 220 using the connector 560, it is possible to reduce the cost of the connector and to suppress human errors such as the use of a wrong connector when connecting together MCFs. Moreover, since a process of dividing multiplexed optical signals having different wavelengths is not required when optical signals are added or dropped in a core, it is possible to reduce the time and labor required for installation and maintenance of devices in the Add/Drop node.

Seventh Embodiment

Figure 17:
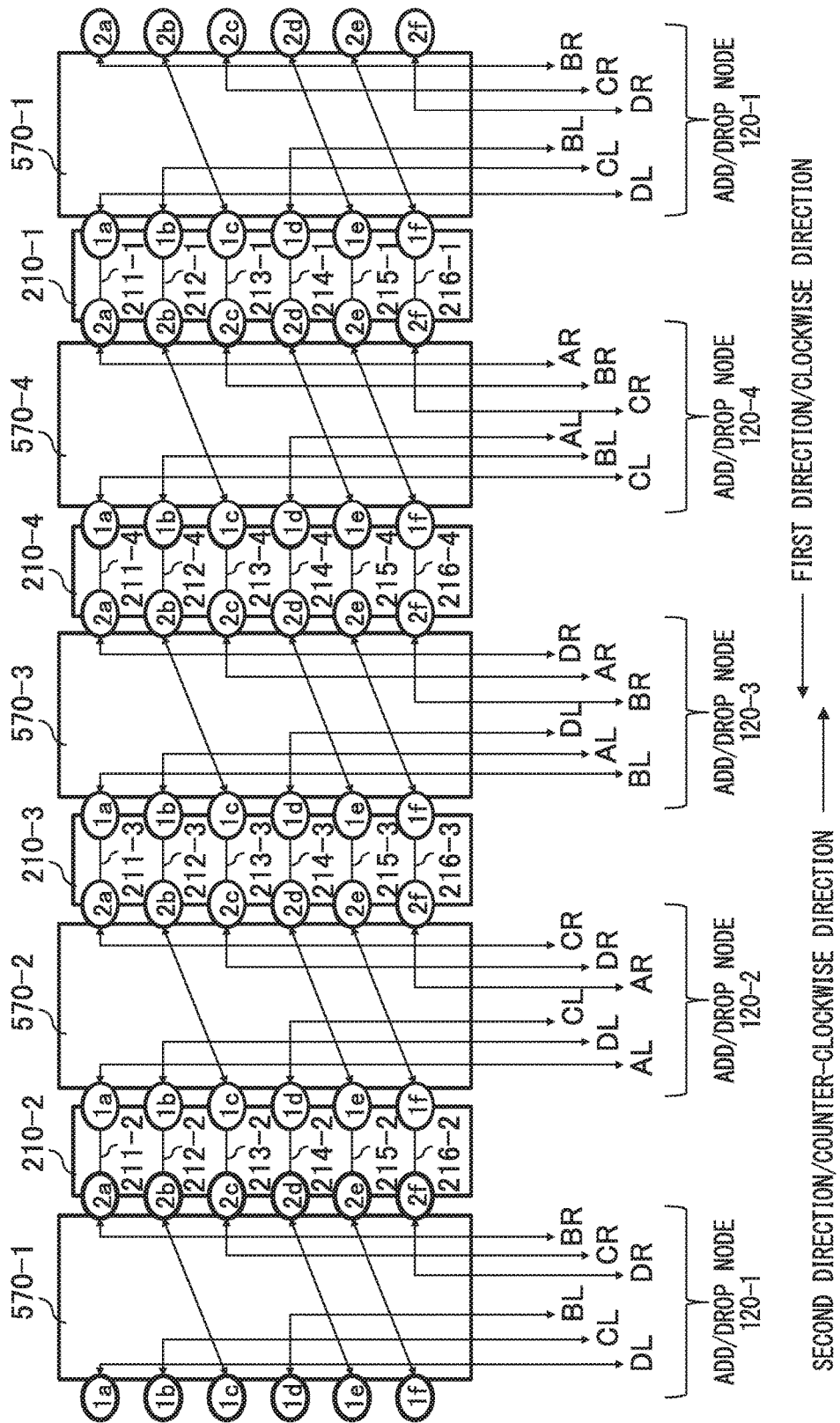
FIG. 17 is a diagram showing the connection between MCFs and connectors of Add/Drop nodes according to a seventh embodiment of the present invention.

In the fifth embodiment, a connector used in a communication system in which one communication path for transmission and reception is formed between Add/Drop nodes has been described. Moreover, in the sixth embodiment, a connector used in a communication system in which one communication path for transmission and one communication path for reception are provided between Add/Drop nodes has been described. In contrast, in a seventh embodiment, a configuration of a connector used in a communication system which has the same physical topology as those of the fifth and sixth embodiments and has a perfect mesh-type logical topology in which a communication path between nodes is duplicated will be described. FIG. 17 is a diagram showing the connection between the MCFs 210 and the connectors 570 of each of the Add/Drop nodes 120 of the seventh embodiment. The MCF 210 that connects together the Add/Drop nodes 120 includes six cores 211 to 216. In this example, although a description is provided focusing on the connector 570-3 provided in the Add/Drop node 120-3, all connectors 570 have the same configuration.

In the Add/Drop node 120-3, the Add/Drop node 120-2 is connected to the first direction side which is a clockwise direction of a ring shape that connects together the nodes of the communication system via the MCF 210-3. The Add/Drop node 120-4 is connected to a second direction side which is a counter-clockwise direction via the MCF 210-4. The connector 570-3 is connected to the MCF 210-3 on the first direction side and the MCF 210-3 on the second direction side. The connector 570-3 has connection points connected to the respective cores 211 to 216 of the MCF 210-3 and the respective cores 211-216 of the MCF 210-4. At each connection point, an optical signal is input and output to and from cores connected thereto. The connector 560-3 has connection points 1a to 1f for the respective cores of the MCF 210-3 and connection points 2a to 2f for the respective cores of the MCF 210-4.

In the connector 570-3, the connection point 1a is connected to the core 211-3 of the MCF 210-3. The connection point 1a drops an optical signal addressed to the subject node from the Add/Drop node 120-2 connected to the first direction side of the subject node from the core 211-3. The optical signal dropped by the connection point 1a is connected to the transceiving device provided in the subject node. Moreover, the connection point 1a adds an optical signal which is generated by the transceiving device provided in the subject node and is addressed from the subject node to the Add/Drop node 120-2 to the core 211-3.

The connection point 1b is connected to the core 212-3 of the MCF 210-3. The connection point 1b drops an optical signal addressed to the subject node from the Add/Drop node 120-1 located two nodes ahead in the first direction from the subject node from the core 212-3. The optical signal dropped by the connection point 1b is connected to the transceiving device provided in the subject node. Moreover, the connection point 1b adds an optical signal which is generated by the transceiving device of the subject node and is addressed from the subject node to the Add/Drop node 120-1 to the core 212-3.

The connection point 1c is connected to the core 213-3 of the MCF 210-3. The connection point 1c drops an optical signal addressed from the Add/Drop node 120-2 connected to the first direction side of the subject node to the Add/Drop node 120-4 connected to the second direction side of the subject node from the core 213-3. The optical signal dropped by the connection point 1c is relayed to the core 212-4 by being connected to the connection point 2b. Moreover, the connection point 1c connects an optical signal which is dropped by the connection point 2b and is addressed from the Add/Drop node 120-4 to the Add/Drop node 120-2 to the core 213-3.

The connection point 1d is connected to the core 214-3 of the MCF 210-3. The connection point 1d drops an optical signal addressed to the subject node from the Add/Drop node 120-4 located three node ahead in the first direction from the subject node from the core 214-3. The optical signal dropped by the connection point 1d is connected to the transceiving device of the subject node. Moreover, the connection point 1d adds an optical signal which is generated by the transceiving device of the subject node and is addressed from the subject node to the Add/Drop node 120-4 to the core 214-3.

The connection point 1e is connected to the core 215-3 of the MCF 210-3. The connection point 1e drops an optical signal addressed from the Add/Drop node 120-1 located two nodes ahead in the first direction from the subject node to the Add/Drop node 120-4 connected to the second direction side from the core 215-3. The optical signal dropped by the connection point 1e is relayed to the core 214-4 by being connected to the connection point 2d. Moreover, the connection point 1e connects an optical signal which is dropped by the connection point 2d and is addressed from the Add/Drop node 120-4 to the Add/Drop node 120-1 to the core 215-3.

The connection point 1f is connected to the core 216-3 of the MCF 210-3. The connection point 1f drops an optical signal addressed from the Add/Drop node 120-2 connected to the first direction side of the subject node to the Add/Drop node 120-1 located two nodes ahead in the second direction from the subject node. The optical signal dropped by the connection point 1f is relayed to the core 215-4 by being connected to the connection point 2e. Moreover, the connection point 1f connects an optical signal which is dropped by the connection point 2e and is addressed from the Add/Drop node 120-1 located two nodes ahead in the second direction of the subject node to the Add/Drop node 120-2 connected to the first direction side to the core 216-3.

The connection point 2a is connected to the core 211-4 of the MCF 210-4. The connection point 2a adds an optical signal which is generated by the transceiving device of the subject node and is addressed to the Add/Drop node 120-4 connected to the second direction side of the subject node to the core 211-4. Moreover, the connection point 2a drops an optical signal addressed from the Add/Drop node 120-4 to the subject node from the core 211-4. The optical signal dropped by the connection point 2a is connected to the transceiving device of the subject node.

The connection point 2b is connected to the core 212-4 of the MCF 210-4. The connection point 2b drops an optical signal addressed from the Add/Drop node 120-4 connected to the second direction side of the subject node to the Add/Drop node 120-2 connected to the first direction side of the subject node. The optical signal dropped by the connection point 2b is relayed to the core 213-3 by being connected to the connection point 1c. Moreover, the connection point 2b connects the optical signal dropped by the connection point 1c to the core 212-4.

The connection point 2c is connected to the core 213-4 of the MCF 210-4. The connection point 2c adds an optical signal which is generated by the transceiving device of the subject node and is addressed to the Add/Drop node 120-1 located two nodes ahead in the second direction from the subject node to the core 213-4. Moreover, the connection point 2c drops an optical signal addressed from the Add/Drop node 120-1 to the subject node from the core 213-4. The optical signal dropped by the connection point 2c is connected to the transceiving device of the subject node.

The connection point 2d is connected to the core 214-4 of the MCF 210-4. The connection point 2d drops an optical signal addressed from the Add/Drop node 120-4 connected to the second direction side of the subject node to the Add/Drop node 120-1 located two nodes ahead in the first direction from the subject node. The optical signal dropped by the connection point 2d is relayed to the core 215-3 by being connected to the connection point 1e. Moreover, the connection point 2d connects an optical signal dropped by the connection point 1e to the core 214-4.

The connection point 2e is connected to the core 215-4 of the MCF 210-4. The connection point 2e drops an optical signal addressed from the Add/Drop node 120-1 located two nodes ahead in the second direction from the subject node to the Add/Drop node 120-2 connected to the first direction side of the subject node. The optical signal dropped by the connection point 2e is relayed to the core 216-3 by being connected to the connection point 1f. Moreover, the connection point 2e connects the optical signal dropped by the connection point 1f to the core 215-4.

The connection point 2f is connected to the core 216-4 of the MCF 210-4. The connection point 2f drops an optical signal addressed to the subject node from the Add/Drop node 120-2 located three nodes ahead in the second direction from the subject node from the core 216-4. The optical signal dropped by the connection point 2f is connected to the transceiving device of the subject node. Moreover, the connection point 2f adds an optical signal which is generated by the transceiving device of the subject node and is addressed to the Add/Drop node 120-2 to the core 216-4.

In the MCFs 210-3 and 210-4 connected to the connector 570-3 having the above-described configuration, the core 211 transmits an optical signal for communication between a node connected to the first direction side and a node connected to the second direction side. The core 212 transmits an optical signal for communication between a node located two nodes ahead in the first direction and a node connected to the second direction side. The core 213 transmits an optical signal for communication between a node connected to the first direction side and a node located two nodes ahead in the second direction. The core 214 transmits an optical signal for communication between a node located three nodes ahead in the first direction and a node connected to the second direction side. The core 215 transmits an optical signal for communication between a node located two nodes ahead in the first direction and a node located two nodes ahead in the second direction. The core 216 transmits an optical signal for communication between a node connected to the first direction side and a node located three nodes ahead in the second direction.

When the connector 570 having the above-described configuration is provided in the each Add/Drop node 120, each Add/Drop node 120 can add or drop an optical signal for communication between the subject node and the other Add/Drop nodes 120 and can form a communication path directed to the other Add/Drop nodes 120. In each Add/Drop node 120, the MCF 210 connected to the first direction side and the MCF 210 connected to the second direction side are connected together by the connectors 570 having the same configuration. By connecting together the MCFs 210 using the connector 570, it is possible to reduce the cost of the connector and to suppress human errors such as the use of a wrong connector when connecting together MCFs. Moreover, since a process of dividing multiplexed optical signals having different wavelengths is not required when optical signals are added or dropped in a core, it is possible to reduce the time and labor required for installation and maintenance of devices in the Add/Drop node.

Eighth Embodiment

Figure 18:
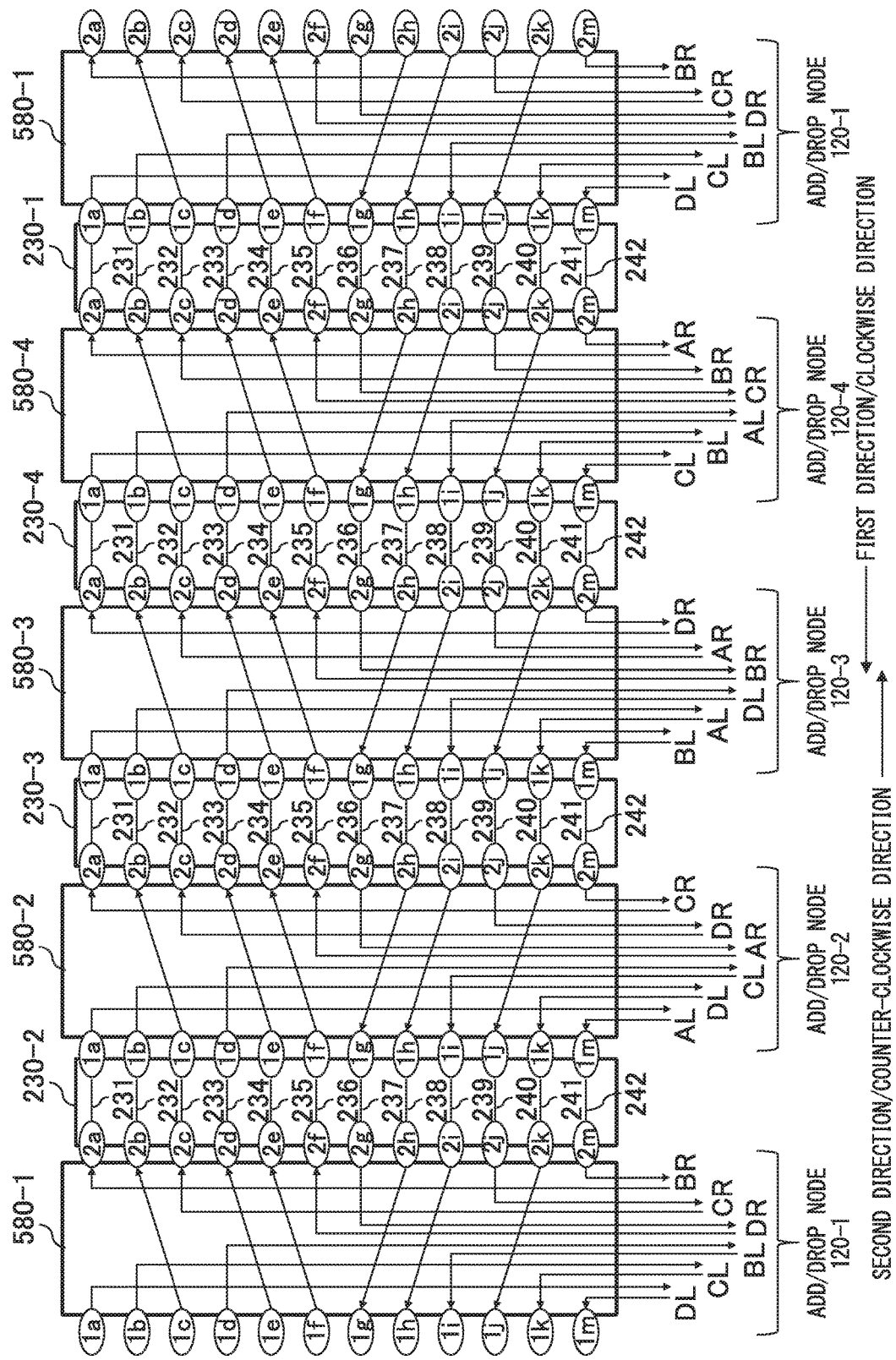
FIG. 18 is a diagram showing the connection between MCFs and connectors of Add/Drop nodes according to an eighth embodiment of the present invention.

In the seventh embodiment, a connector used in a communication system that performs two-way communication in which signals of which the transmission directions are different are transmitted using one core has been described. In an eighth embodiment, a connector used in a communication system which has the same physical topology and the same logical topology as those of the communication system of the seventh embodiment and in which optical signals are transmitted in one direction using one core will be described. FIG. 18 is a diagram showing the connection between the MCF 230 and the connectors 580 of each of the Add/Drop nodes 120 of the eighth embodiment. The MCF 230 that connects together the Add/Drop nodes 120 includes twelve cores 231 to 242. The connector 580 is included in each of the Add/Drop nodes 120-1 to 120-4. In this example, a description is provided focusing on the connector 580-3 provided in the Add/Drop node 120-3. However, all connectors 580 have the same configuration.

In the Add/Drop node 120-3, the Add/Drop node 120-2 is connected to the first direction side which is a clockwise direction of a ring shape that connects together the nodes of the communication system via the MCF 230-3. The Add/Drop node 120-4 is connected to a second direction side which is a counter-clockwise direction via the MCF 230-4. The connector 580-3 is connected to the MCF 230-3 on the first direction side and the MCF 230-4 on the second direction side. The connector 580-3 has connection points connected to the respective cores 231 242 of the MCF 230-3 and the respective cores 231 to 242 of the MCF 230-4. At each connection point, an optical signal is input and output to and from cores connected thereto. The connector 580-3 has connection points 1a to 1m for the respective cores of the MCF 230-3 and connection points 2a to 2m for the respective cores of the MCF 230-4.

In the connector 580-3, the connection point 1a is connected to the core 231 of the MCF 230-3. The connection point 1a drops an optical signal addressed to the subject node from the Add/Drop node 120-2 connected to the first direction side of the subject node from the core 231. The optical signal dropped by the connection point 1a is connected to the transceiving device of the subject node. The connection point 1b is connected to the core 232 of the MCF 230-3. The connection point 1b drops an optical signal addressed to the subject node from the Add/Drop node 120-1 located two nodes ahead in the first direction from the subject node from the core 232. The optical signal dropped by the connection point 1b is connected to the transceiving device of the subject node.

The connection point 1c is connected to the core 233 of the MCF 230-3. The connection point 1c drops an optical signal addressed from the Add/Drop node 120-2 to the Add/Drop node 120-4 connected to the second direction side of the subject node from the core 233. The optical signal dropped by the connection point 1c is relayed to the core 232 of the MCF 230-4 by being connected to the connection point 2b. The connection point 1d is connected to the core 234 of the MCF 230-3. The connection point 1d drops an optical signal addressed to the subject node from the Add/Drop node 120-4 located three nodes ahead in the first direction from the subject node from the core 234. The optical signal dropped by the connection point 1d is connected to the transceiving device of the subject node.

The connection point 1e is connected to the core 235 of the MCF 230-3. The connection point 1e drops an optical signal addressed from the Add/Drop node 120-1 to the Add/Drop node 120-4 from the core 235. The optical signal dropped by the connection point 1e is relayed to the core 234 of the MCF 230-4 by being connected to the connection point 2d. The connection point 1f is connected to the core 236 of the MCF 230-3. The connection point 1f drops an optical signal addressed from the Add/Drop node 120-2 to the Add/Drop node 120-1 located two nodes ahead in the second direction from the subject node from the core 236. The optical signal dropped by the connection point 1f is relayed to the core 234 of the MCF 230-4 by being connected to the connection point 2e.

The connection point 1g is connected to the core 237 of the MCF 230-3. The connection point 1g connects an optical signal which is dropped by the connection point 2h and is addressed from the Add/Drop node 120-1 to the Add/Drop node 120-2 to the core 237. The connection point 1h is connected to the core 238 of the MCF 230-3. The connection point 1h connects an optical signal which is dropped by the connection point 2i and is addressed from the Add/Drop node 120-4 to the Add/Drop node 120-1 to the core 238.

The connection point 1i is connected to the core 239 of the MCF 230-3. The connection point 1i adds an optical signal which is generated by the transceiving device of the subject node and is addressed to the Add/Drop node 120-3 located three nodes ahead in the first direction from the subject node to the core 239. The connection point 1j is connected to the core 240 of the MCF 230-3. The connection point 1j connects an optical signal which is dropped by the connection point 2k and is addressed from the Add/Drop node 120-4 to the Add/Drop node 120-2 to the core 240.

The connection point 1k is connected to the core 241 of the MCF 230-3. The connection point 1k adds an optical signal which is generated by the transceiving device of the subject node and is addressed to the Add/Drop node 120-1 to the core 241. The connection point 1m is connected to the core 242 of the MCF 230-3. The connection point 1m adds an optical signal which is generated by the transceiving device of the subject node and is addressed to the Add/Drop node 120-2 to the core 242.

The connection point 2a is connected to the core 231 of the MCF 230-4. The connection point 2a adds an optical signal which is generated by the transceiving device of the subject node and is addressed to the Add/Drop node 120-4 to the core 231. The connection point 2b is connected to the core 232 of the MCF 230-4. The connection point 2b connects the optical signal dropped by the connection point 1c to the core 232.

The connection point 2c is connected to the core 233 of the MCF 230-4. The connection point 2c adds an optical signal which is generated by the transceiving device of the subject node and is addressed to the Add/Drop node 120-1 to the core 233. The connection point 2d is connected to the core 234 of the MCF 230-4. The connection point 2d connects the optical signal dropped by the connection point 1e to the core 234.

The connection point 2e is connected to the core 235 of the MCF 230-4. The connection point 2e connects the optical signal dropped by the connection point 1f to the core 235. The connection point 2f is connected to the core 236 of the MCF 230-4. The connection point 2f adds an optical signal which is generated by the transceiving device of the subject node and is addressed to the Add/Drop node 120-2 located three nodes ahead in the second direction from the subject node to the core 236.

The connection point 2g is connected to the core 237 of the MCF 230-4. The connection point 2g drops an optical signal addressed from the Add/Drop node 120-2 to the subject node from the core 237. The optical signal dropped by the connection point 2g is connected to the transceiving device of the subject node. The connection point 2h is connected to the core 238 of the MCF 230-4. The connection point 2h drops an optical signal addressed from the Add/Drop node 120-1 to the Add/Drop node 120-2. The optical signal dropped by the connection point 2h is relayed to the core 237 of the MCF 230-3 by being connected to the connection point 1g.

The connection point 2i is connected to the core 239 of the MCF 230-4. The connection point 2i drops an optical signal addressed from the Add/Drop node 120-4 to the Add/Drop node 120-1 from the core 239. The optical signal dropped by the connection point 2i is relayed to the core 238 of the MCF 230-3 by being connected to the connection point 1h. The connection point 2j is connected to the core 240 of the MCF 230-4. The connection point 2j drops an optical signal addressed from the Add/Drop node 120-1 to the subject node from the core 240. The optical signal dropped by the connection point 2j is connected to the transceiving device of the subject node.

The connection point 2k is connected to the core 241 of the MCF 230-4. The connection point 2k drops an optical signal addressed from the Add/Drop node 120-4 to the Add/Drop node 120-2 connected to the first direction side of the subject node from the core 241. The optical signal dropped by the connection point 2k is relayed to the core 240 of the MCF 230-3 by being connected to the connection point 1j. The connection point 2m is connected to the core 242 of the MCF 230-4. The connection point 2m drops an optical signal addressed from the Add/Drop node 120-4 to the subject node from the core 242. The optical signal dropped by the connection point 2m is connected to the transceiving device of the subject node.

In the MCFs 230-3 and 230-4 connected to the connector 580-3 having the above-described configuration, the core 231 transmits an optical signal from a node connected to the first direction side to a node connected to the second direction side. The core 232 transmits an optical signal from a node located two nodes ahead in the first direction to a node connected to the second direction side. The core 233 transmits an optical signal from a node connected to the first direction side to a node located two nodes ahead in the second direction. The core 234 transmits an optical signal from a node located three nodes ahead in the first direction to a node connected to the second direction side. The core 235 transmits an optical signal from a node located two nodes ahead in the first direction to a node located two nodes ahead in the second direction.

The core 236 transmits an optical signal from a node connected to the first direction side to a node located three nodes ahead in the second direction. The core 237 transmits an optical signal from a node located three nodes ahead in the second direction to a node connected to the first direction side. The core 238 transmits an optical signal from a node located two nodes ahead in the second direction to a node located two nodes ahead in the first direction. The core 239 transmits an optical signal from a node connected to the second direction side to a node located three nodes ahead in the first direction. The core 240 transmits an optical signal from a node located two nodes ahead in the second direction to a node connected to the first direction side. The core 241 transmits an optical signal from a node connected to the second direction side to a node located two nodes ahead in the first direction. The core 242 transmits an optical signal from a node connected to the second direction side to a node connected to the first direction side.

When the connector 580 having the above-described configuration is provided in each Add/Drop node 120, each Add/Drop node 120 can add or drop an optical signal for communication between the subject node and the other Add/Drop nodes 120 and can form a communication path with the other Add/Drop nodes 120. In each Add/Drop node 120, the MCF 230 connected to the first direction side and the MCF 230 connected to the second direction side are connected together by the connectors 580 having the same configuration. By connecting together the MCFs 230 using the connector 580, it is possible to reduce the cost of the connector and to suppress human errors such as the use of a wrong connector when connecting MCFs. Moreover, since a process of dividing multiplexed optical signals having different wavelengths is not required when optical signals are added or dropped in a core, it is possible to reduce the time and labor required for installation and maintenance of devices in the Add/Drop node.

The connectors provided in the Add/Drop nodes of the communication systems of the fifth to eighth embodiments have the same configuration. For example, each connector has a configuration in which the connector connects a first MCF that connects the subject node in which the connector is provided to a first Add/Drop node adjacent to the subject node to a second MCF that connects the subject node to a second Add/Drop node adjacent to the first node on the opposite side. Moreover, the connector has a first connection point that adds or drops an optical signal for communication between the first Add/Drop node and the subject node to or from a first core of the first MCF and a second connection point that adds or drops an optical signal for communication between the second Add/Drop node and the subject node to or from a first core of the second MCF. Here, the first core of the second MCF is the first core of the first MCF when seen from the second Add/Drop node. That is, the connector has such a configuration in which a relative positional relationship between a connection point for a core through which an optical signal added or dropped in the subject node is transmitted and a connection point for a core through which an optical signal is relayed is the same for the respective Add/Drop nodes. Moreover, the connector includes a connecting portion that adds or drops an optical signal to or from a core through which communication between the subject node and other nodes is transmitted and a signal relay portion that relays, between the first and second MCFs, signals transmitted through a core allocated for communication between other nodes. For example, in the connector 550-3 shown in FIG. 15, the connecting portion is configured to include the connection point 1*b* that connects an optical signal from the core 202-3 to the transceiving device, and the signal relay portion is configured to include the connection points 1*a* and 2*b* that are connected to the cores 201-3 and 202-4 to relay an optical signal between both cores.

Here, the number of cores necessary in the MCF used in the communication system will be described. Like the communication system shown in FIG. 15, when a communication system has a ring-type physical topology and a perfect mesh-type logical topology and optical signals are transmitted in one direction in each core, if the number of nodes is N, the number of necessary cores C is obtained by Equation (1). It is assumed that N≥3, since a ring-type physical topology cannot be constructed under a condition of N≤2.

[Math. 1]

$$\begin{cases} C = \sum_{x=1}^{n} 2x & \text{where } N \text{ is an odd number } (N = 2n-1, n \geq 2) \\ C = 2 + \sum_{x=1}^{n-1} 2x & \text{where } N \text{ is an even number } (N = 2n, n \geq 2) \end{cases} \quad (1)$$

Moreover, like the communication system shown in FIG. 16, when a communication system has a ring-type physical topology and a perfect mesh-type logical topology and optical signals are transmitted in two directions in each core, if the number of nodes is N, the number of necessary cores C is obtained by Equation (2).

[Math. 2]

$$\begin{cases} C = \sum_{x=1}^{n} x & \text{where } N \text{ is an odd number } (N = 2n-1, n \geq 2) \\ C = \frac{n}{2} + \sum_{x=1}^{n-1} x & \text{where } N \text{ is an even number } (N = 2n, n \geq 2) \end{cases} \quad (2)$$

Moreover, like the communication system shown in FIG. 17, when a communication system has a ring-type physical topology and a perfect mesh-type logical topology, optical signals are transmitted in two directions in each core, and a communication path is duplicated, if the number of nodes is N, the number of necessary cores C is obtained by Equation (3).

[Math. 3]

$$C = \sum_{x=1}^{n} x \quad (3)$$

Moreover, like the communication system shown in FIG. 18, when a communication system has a ring-type physical topology and a perfect mesh-type logical topology, optical signals are transmitted in one direction in each core, and a communication path is duplicated, if the number of nodes is N, the number of necessary cores C is obtained by Equation (4).

[Math. 4]

$$C = \sum_{x=1}^{n} 2x \quad (4)$$

Figure 19A:
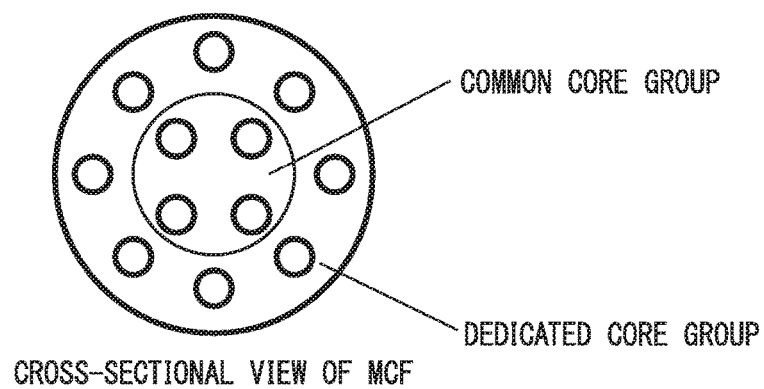
FIG. 19A is a diagram showing an example in which a common core is provided in a multi-core fiber according to the present invention.
Figure 19B:
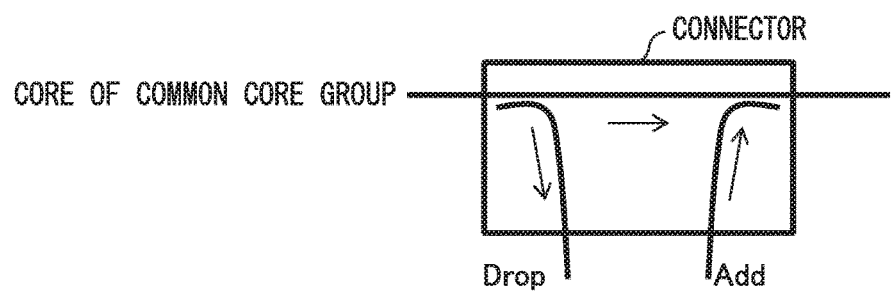
FIG. 19B is a diagram showing the concept of Add/Drop of an optical signal to/from a common core.

In the communication systems of the respective embodiments, a configuration in which all cores of the MCF that connects nodes are used has been described. However, an MCF having a number of cores larger than the number of cores necessary for connecting nodes may be used. In this case, cores that are not used for connecting nodes may be secured as common cores, and the common cores may be used when a traffic demand has increased dramatically or a fault occurs in a core being used. FIGS. 19A and 19B are diagrams showing an example of a configuration in which a common core is provided in a multi-core fiber of the present invention. FIG. 19A shows a cross-sectional view of a multi-core fiber. The cores disposed on the outer circumference side of the multi-core fiber may be used as a dedicated core group of cores used in communication between nodes in the communication systems of the respective embodiments and the cores disposed on the inner side may be used as a common core group. When the common cores are provided in this manner, the connector may include the first connector portion described in the each embodiment and the second connector portion for adding and dropping optical signals to and from the common cores. The cores of the common core group may be used for different purposes and a plurality of common cores may be used for the same purpose. Moreover, the common cores may be used for a purpose other than the communication between nodes.

FIG. 19B shows the concept of Add/Drop of an optical signal to/from a common core. Rather than adding and dropping an optical signal in each common core, a part of the optical signal of the common core may be dropped and added so that the connectors have the same configuration in all nodes which is configured to use the common core group. As shown in FIG. 19B, in some or all nodes, a part of the optical signal of the common cores is added and dropped and other part of the optical signal is allowed to pass. In this case, the ratio of an optical signal added or dropped to an optical signal allowed to pass depends on the number of nodes. In this configuration, it is not necessary to change a connector when using common cores and the common cores can be used appropriately as necessary.

Moreover, although the connectors in the communication systems of the respective embodiments can be used when implementing a tree-type or a perfect mesh-type logical topology, the connectors may be used in a form in which an optical signal is not transmitted to some cores. For example, although a connector used in a communication system including two transceiving nodes has been described in the above-described embodiments, the connector can be used similarly in a communication system having one transceiving node. In this case, a core that forms a partial communication path is not used.

In the communication systems of the embodiments, a configuration example in which a MCF is used in the connection between nodes has been described. However, as shown in FIGS. 9 and 10, a plurality of SCFs may be used in a partial segment or a plurality of segments of the connection between nodes.

Moreover, the correspondence between the connection points of the connector and the Add/Drop target core and the arrangement and the positions of the connection points described in the communication systems of the embodiments are examples only, and the correspondence shown in the drawings and the arrangement, the positions of the connection points, and the like are not limited to those described in the embodiments.

While embodiments of the present invention have been described with reference to the drawings, a specific structure is not limited to the embodiments but the present invention embraces design modifications made without departing from the spirit of the present invention.

INDUSTRIAL APPLICABILITY

The present invention is applicable to a use in which it is indispensable to facilitate adding and dropping of optical signals in nodes connected to a multi-core fiber.

REFERENCE SIGNS LIST

120 Add/Drop node
125, 126 Transceiving device
200, 210, 220, 230 MCF (Multi Core Fiber)
201, 202, 203 Core
211, 212, 213, 214, 215, 216 Core
221, 222, 223, 224 Core
231, 232, 233, 234, 235, 236, 237, 238, 239, 240, 241, 242 Core
400, 410 Conversion connector
451, 452, 453 SCF (Single Core Fiber)
500 Communication system
510, 520, 530, 540, 550, 560, 570, 580 Connector

The invention claimed is:

1. A communication system comprising:
three or more nodes; and
a multi-core fiber having a plurality of cores, the multi-core fiber being used in at least a partial segment of the connection between the three or more nodes, wherein
one node of the three or more nodes is connected to the multi-core fiber and includes a connector configured to add and drop a signal to and from an allocated core exclusively allocated from among the plurality of cores as a communication path between the one node and another node of the three or more nodes and/or configured to relay a signal transmitted through another core of the plurality of cores allocated for communication between other nodes in the multi-core fiber connected to the one node, and
a relative positional relationship between a first connection position of the allocated core in which a signal is added or dropped in the connector and a second connection position of another core in which a signal is relayed in the connector is the same for all of the three or more nodes connected to the multi-core fiber.

2. The communication system according to claim 1, wherein each of the three or more nodes is connected to two other nodes.

3. The communication system according to claim 1, wherein
at least one node of the three or more nodes has a communication path directed to each of the other nodes, and
each communication path uses a respective allocated core.

4. The communication system according to claim 1, wherein
   a plurality of the three or more nodes have communication paths directed to other nodes of the three or more nodes, respectively, and
   each of the communication paths uses a respective allocated core.

5. The communication system according to claim 4, wherein
   all of the three or more nodes have the communication paths directed to the other nodes, respectively, and
   each of the communication paths uses the respective allocated core.

6. The communication system according to claim 1, wherein the one node has one communication path for each communication target node of three or more nodes.

7. The communication system according to claim 1, wherein
   the one node has a communication path for each communication target node of three or more nodes, and
   the allocated core allocated to the communication path differs for each communication target node.

8. The communication system according to claim 1, wherein
   the one node uses different communication paths for transmission and reception in communication with a communication target node of the three or more nodes, and
   each of the communication paths uses a respective allocated core.

9. The communication system according to claim 1, wherein
   the one node uses a communication path for transmission and reception in communication with a communication target node of the three or more nodes, and
   the allocated core is used for the communication path.

10. The communication system according to claim 1, wherein
    the plurality of cores are arranged on a circumference around a central shaft of the multi-core fiber, and
    the connector is attached to the multi-core fiber at a position rotated by different angle at each of the three or more nodes around the central axis with respect to a reference position.

11. The communication system according to claim 1, wherein
    the connector includes:
       at least one connecting portion configured to add or drop a signal to or from a core of the plurality of cores through which communication with another node adjacent to the one node in which the connector is provided; and
       at least one signal relay portion configured to relay a signal transmitted through the another core of the plurality of cores allocated for communication between the other nodes in the multi-core fiber connected to the one node, and
    the number of the at least one signal relay portion provided in the connector is equal to or larger than the number of other node of the three or more nodes through which a communication path from the one node to a communication target node of the three or more nodes passes.

12. The communication system according to claim 1, wherein
    the connector includes:
       a first connector portion configured to add and drop a signal to and from a communication core used for communication between the one node and another node of the three or more nodes among the plurality of cores and configured to relay signals of communication cores other than the communication core to and from which the signal is added and dropped between multi-core fibers connected to the one node in which the connector is provided; and
       a second connector portion configured to add, drop or relay a signal to, from or between common cores used for a purpose other than communication between the three or more nodes among the plurality of cores.

13. The communication system according to claim 12, wherein
    the one node connected to the multi-core fiber uses the signals added or dropped by the second connector portion.

14. The communication system according to claim 12, wherein
    the second connector portion provided in the one node connected to the multi-core fiber adds or drops a signal to or from one core of the common cores.

15. The communication system according to claim 1, wherein
    the connector includes small-diameter single-mode fibers provided to correspond to the plurality of cores, and
    the small-diameter single-mode fibers are configured to add or drop signals to or from the plurality of cores and are configured to relay signals between multi-core fibers connected to the one node in which the connector is provided.

16. The communication system according to claim 1, wherein
    the connector includes an optical waveguide including waveguide cores provided to correspond to the plurality of cores, and
    the waveguide cores are configured to add or drop signals to or from the plurality of cores and are configured to relay signals between multi-core fibers connected to the one node in which the connector is provided.

17. The communication system according to claim 1, wherein
    the connector includes:
       a first optical element configured to spatially split signals output from the plurality of cores of the multi-core fiber connected to the one node in which the connector is provided;
       a second optical element configured to drop a signal by changing a propagating direction of the signal spatially split by the first optical element to the outside of the connector;
       a third optical element configured to add an input signal by changing a propagating direction of the input signal input from the outside of the connector to the propagating direction of spatially split signals; and
       a fourth optical element configured to input the signals spatially split by the first optical element and the input signal of which the propagating direction is changed by the third optical element to the plurality of cores of another multi-core fiber connected to the one node in which the connector is provided.

18. A connector used in a node connected to a multi-core fiber in a communication system including three or more nodes, the multi-core fiber having a plurality of cores and being used in at least a partial segment of the connection between the three or more nodes, wherein
- the connector is configured to add and drop a signal to and from allocated cores exclusively allocated as a communication path between the one node in which the connector is provided and another node of the three or more nodes, and
- a relative positional relationship between a first connection position of one of the allocated cores in which a signal is added in the connector and a second connection position of another one of the allocated cores in which a signal is dropped in the connector is the same for all of the connectors used in the three or more nodes connected to the multi-core fiber.

19. The connector according to claim 18, wherein
- the connector relays a signal transmitted through a core other than the allocated cores, the signal being transmitted for communication between the other nodes between multi-core fibers connected to a subject node, and
- a relative positional relationship among the first connection position of one of the allocated cores in which a signal is added in the connector, the second connection position of another one of the allocated cores in which a signal is dropped in the connector, and a third connection position of the core other than the allocated cores in which a signal is relayed in the connector is the same for all of the connectors used in the three or more nodes connected to the multi-core fiber.

* * * * *